United States Patent
Hsieh et al.

(10) Patent No.: US 12,253,694 B2
(45) Date of Patent: Mar. 18, 2025

(54) OPTICAL SYSTEM

(71) Applicant: VisEra Technologies Company Ltd., Hsin-Chu (TW)

(72) Inventors: Hsin-Yi Hsieh, Hsin-Chu (TW); Po-Han Fu, Hsin-Chu (TW); Hsin-Wei Mao, Hsin-Chu (TW); Wei-Ko Wang, Hsin-Chu (TW); Chin-Chuan Hsieh, Hsin-Chu (TW)

(73) Assignee: VisEra Technologies Company Ltd., Hsin-Chu (TW)

( * ) Notice: Subject to any disclaimer, the term of this patent is extended or adjusted under 35 U.S.C. 154(b) by 560 days.

(21) Appl. No.: 17/732,329

(22) Filed: Apr. 28, 2022

(65) Prior Publication Data

US 2023/0350111 A1  Nov. 2, 2023

(51) Int. Cl.
  *G02B 5/18* (2006.01)
  *G02B 27/09* (2006.01)
  *G02B 27/10* (2006.01)
  *G02B 27/44* (2006.01)

(52) U.S. Cl.
  CPC ....... *G02B 5/1819* (2013.01); *G02B 27/0944* (2013.01); *G02B 27/1086* (2013.01); *G02B 27/44* (2013.01)

(58) Field of Classification Search
  CPC .. G02B 5/1819; G02B 27/0944; G02B 27/44; G02B 27/1086
  USPC ........................................................ 359/569
  See application file for complete search history.

(56) References Cited

U.S. PATENT DOCUMENTS

| | | |
|---|---|---|
| 5,363,226 A | 11/1994 | Strasser et al. |
| 2018/0252857 A1 | 9/2018 | Glik et al. |
| 2020/0150424 A1 | 5/2020 | Browy et al. |

(Continued)

FOREIGN PATENT DOCUMENTS

| | | |
|---|---|---|
| CN | 110352377 A | 10/2019 |
| CN | 113625386 A | 11/2021 |
| CN | 114185174 A | 3/2022 |

(Continued)

OTHER PUBLICATIONS

Wenbo Zang et al., "Chromatic Dispersion Manipulation Based on Metalenses", Advanced Materials, vol. 32, Issue 27, 1904935 (20 pages), Dec. 11, 2019.

*Primary Examiner* — Wyatt A Stoffa
*Assistant Examiner* — Mitchell T Oestreich
(74) *Attorney, Agent, or Firm* — LIU & LIU

(57) ABSTRACT

The optical system includes a projector, a deflector, a polarizer, a first grating coupler structure, and a second grating coupler structure. The projector emits three beams having different wavelengths. The deflector is disposed below the projector and is configured to change incident angles of the three beams and to focus the three beams at the same region of the first grating coupler structure. The first grating coupler structure is below the deflector and is configured to couple the three beams into a light-guide lens such that the three beams travel the same optical path within the light-guide lens. The light-guide lens is connected to the first grating coupler structure and is configured to transmit the three beams. The polarizer is disposed between the projector and the deflector and is configured to filter out transverse electric (TE) modes or transverse magnetic (TM) modes of the three beams.

20 Claims, 18 Drawing Sheets

(56) References Cited

U.S. PATENT DOCUMENTS

2020/0225479 A1     7/2020  Chi et al.
2021/0055555 A1*    2/2021  Chi .................... G02B 1/11

FOREIGN PATENT DOCUMENTS

| | | |
|---|---|---|
| JP | 2011248318 | 12/2011 |
| JP | 2015049376 | 3/2015 |
| JP | 2015194549 | 11/2015 |
| JP | 2020046530 | 3/2020 |
| JP | 2020514832 | 5/2020 |
| JP | 2020101671 | 7/2020 |
| JP | 2021193467 | 12/2021 |
| TW | I754010 B | 2/2022 |
| WO | 2020041620 | 2/2020 |
| WO | 2020243111 A1 | 3/2020 |

\* cited by examiner

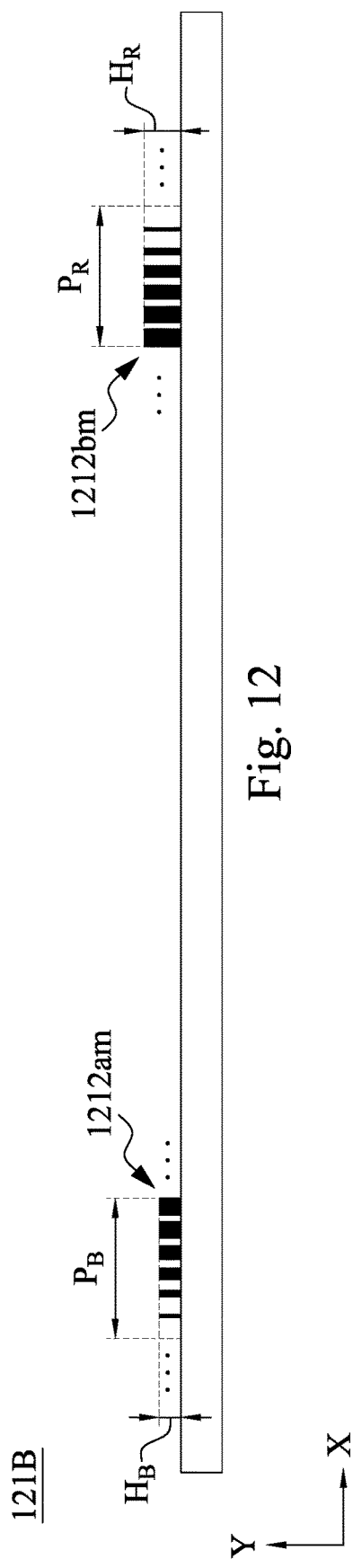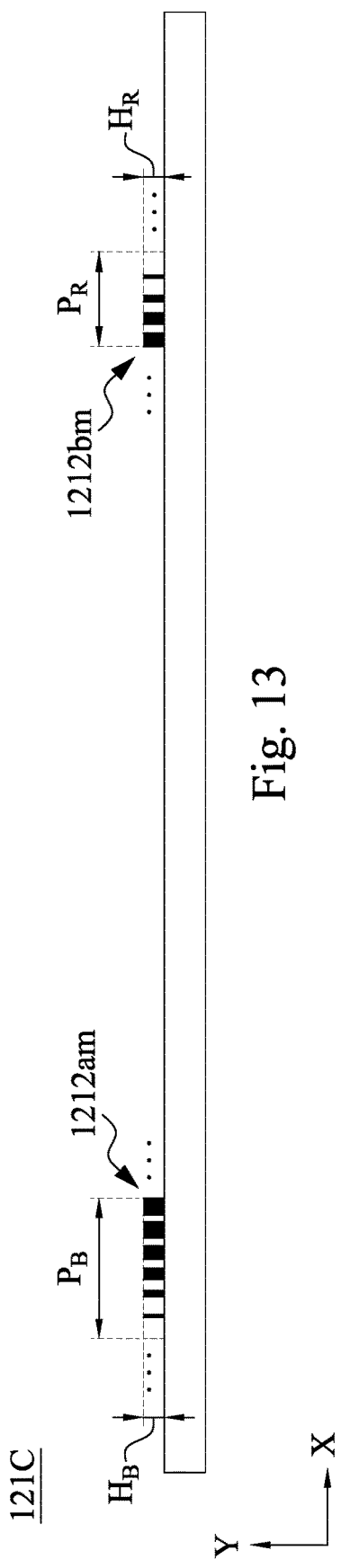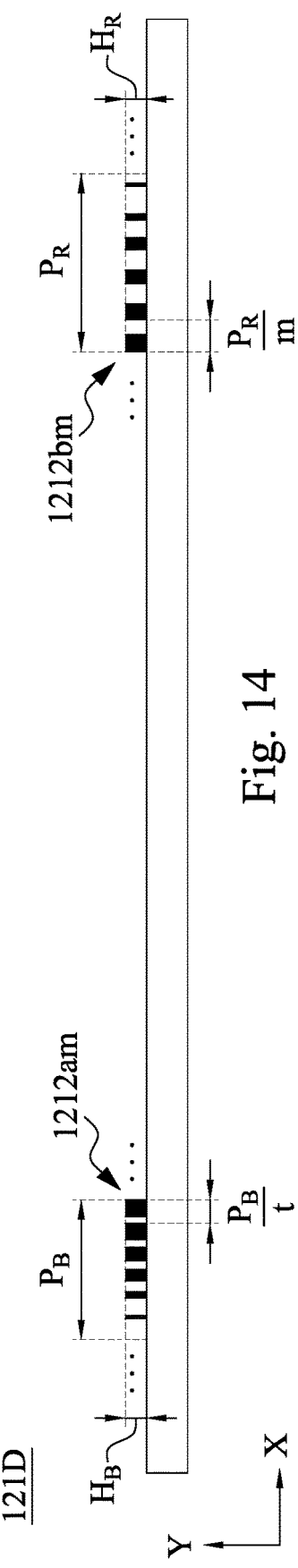

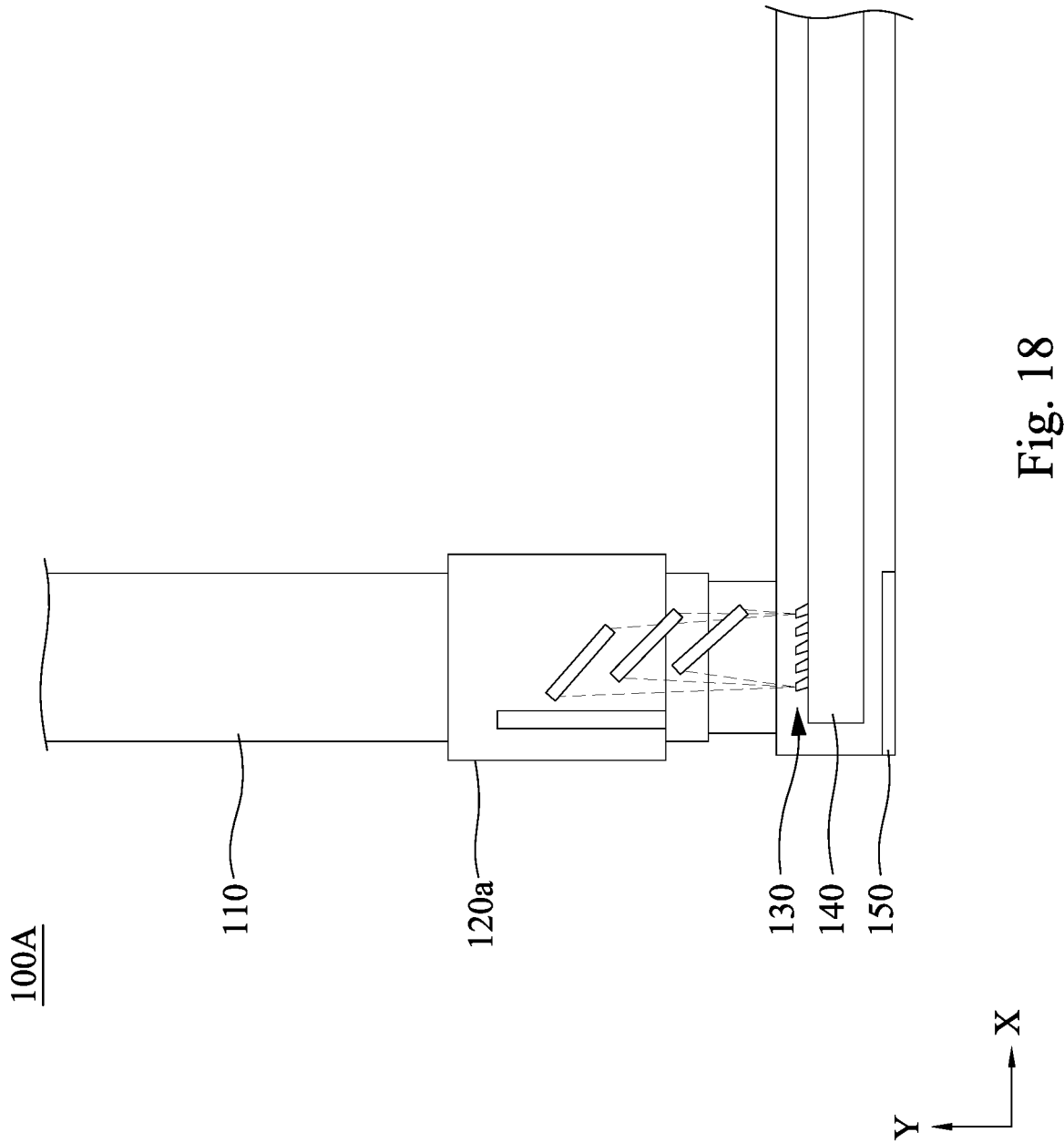

OPTICAL SYSTEM

BACKGROUND

Field of Invention

The present disclosure relates to an optical system. More particularly, the optical system includes variation structures of a deflector.

Description of Related Art

Grating couplers could be used for delivery images by transmitting an external light into and out of a light-guide lens on an optical device. However, for colored images, the external light includes several wavelengths having different colors, such as RGB lights. When the colored image with different wavelengths couples into the same light-guide lens, their first diffractive angles will be different and will likely result in different optical paths of the RGB lights, thereby causing the problem of imaging at the grating coupling out region. Therefore, there is a need to solve the above problems.

SUMMARY

One aspect of the present disclosure is to provide an optical system. The optical system includes a projector, a deflector, a polarizer, a first grating coupler structure, a first grating coupler structure, and a second grating coupler structure. The projector emits three beams having different wavelengths. The deflector is disposed below the projector and is configured to change incident angles of the three beams and to focus the three beams at the same region of the first grating coupler structure. The first grating coupler structure is below the deflector and is configured to couple the three beams into a light-guide lens such that the three beams travel the same optical path within the light-guide lens. The light-guide lens is connected to the first grating coupler structure and is configured to transmit the three beams. The polarizer is disposed between the projector and the deflector. The polarizer is configured to filter out transverse electric (TE) modes or transverse magnetic (TM) modes of the three beams. The second grating coupler structure is disposed on the light-guide lens and is configured to enable the three beams departing from the light-guide lens after the three beams have traveled the same optical path.

According to some embodiments of the present disclosure, the deflector includes a substrate, a first grating deflector structure, and a second grating deflector structure. The substrate has a blue region, a green region, and a red region, in which the blue region and the red region are separated by the green region, and each region is in a range from 1 mm to 8 mm. The first grating deflector structure is disposed on the blue region of the substrate. The second grating deflector structure disposed on the red region of the substrate.

According to some embodiments of the present disclosure, a spacing between the blue region and the green region (or the green region and the red region) is in a range from 100 nm to 2 mm.

According to some embodiments of the present disclosure, each of the first grating deflector structure and the second grating deflector structure comprises a blazed grating structure, a n-step grating structure, a slanted grating structure, or combinations thereof, wherein a refractive index of each of the first grating deflector structure and the second grating deflector structure is in a range from 1.7 to 3.5.

According to some embodiments of the present disclosure, the first grating deflector structure includes a first meta-grating structure, the first meta-grating structure includes a first longitudinal unit having a first width $W1$, a second longitudinal unit having a second width $W2$, a third longitudinal unit having a third width $W3$, and $W1 \leq W2 \leq W3$. The first longitudinal unit, the second longitudinal unit, and the third longitudinal unit sequentially are disposed along an outer surface of the blue region of the substrate to an inner surface of the blue region of the substrate.

According to some embodiments of the present disclosure, the first meta-grating structure further includes a fourth longitudinal unit having a fourth width $W4$, a fifth longitudinal unit having a fifth width $W5$, and $W3 \geq W4 \geq W5$. The fourth longitudinal unit is next to the third longitudinal unit, and the fifth longitudinal unit is next to the fourth longitudinal unit.

According to some embodiments of the present disclosure, the second grating deflector structure includes a second meta-grating structure, the second meta-grating structure includes a fourth longitudinal unit having a fourth width $W4$, a fifth longitudinal unit having a fifth width $W5$, a sixth longitudinal unit having a sixth width $W6$, and $W4 \leq W5 \leq W6$. The fourth longitudinal unit, the fifth longitudinal unit, and the sixth longitudinal unit sequentially are disposed along an outer surface of the red region of the substrate to an inner surface of the red region of the substrate.

According to some embodiments of the present disclosure, the second meta-grating structure further includes a seventh longitudinal unit having a seventh width $W7$, an eighth longitudinal unit having a eighth width $W8$, and $W6 \geq W7 \geq W8$. The seventh longitudinal unit is next to the fourth longitudinal unit, and the eighth longitudinal unit is next to the seventh longitudinal unit.

According to some embodiments of the present disclosure, the first longitudinal unit, the second longitudinal unit, and the third longitudinal unit have a first height. The fourth longitudinal unit, the fifth longitudinal unit, and the sixth longitudinal unit have a second height. The first height is the same as the second height.

According to some embodiments of the present disclosure, the first longitudinal unit, the second longitudinal unit, and the third longitudinal unit have a first height. The fourth longitudinal unit, the fifth longitudinal unit, and the sixth longitudinal unit have a second height. The first height is different from the second height.

According to some embodiments of the present disclosure, a first period of the first grating deflector structure is the same as a second period of the second grating deflector structure.

According to some embodiments of the present disclosure, a first period of the first grating deflector structure is different from a second period of the second grating deflector structure.

According to some embodiments of the present disclosure, the first grating deflector structure includes a first meta-grating structure, and the first meta-grating structure includes a plurality of longitudinal units gradational in width. The second grating deflector structure includes a second meta-grating structure, and the second meta-grating structure includes a plurality of longitudinal units gradational in width. The number of the longitudinal units of the first meta-grating structure is the same as the number of the longitudinal units of the second meta-grating structure.

According to some embodiments of the present disclosure, the first grating deflector structure includes a first meta-grating structure, and the first meta-grating structure includes a plurality of longitudinal units gradational in width. The second grating deflector structure includes a second meta-grating structure, and the second meta-grating structure includes a plurality of longitudinal units gradational in width. The number of the longitudinal units of the first meta-grating structure is different from the number of the longitudinal units of the second meta-grating structure.

According to some embodiments of the present disclosure, each of the first grating deflector structure and the second grating deflector structure includes a first cylinder unit having a first diameter D1, a second cylinder unit having a second diameter D2, a third cylinder unit having a third diameter D3, and D1≤D2≤D3. The first cylinder unit, the second cylinder unit, and the third cylinder unit sequentially are disposed along an outer surface of the blue region or the red region of the substrate to an inner surface of the blue region or the red region of the substrate.

According to some embodiments of the present disclosure, each of the first grating deflector structure and the second grating deflector structure further includes a fourth cylinder unit having a fourth diameter D4, a fifth cylinder unit having a fifth diameter D5, and D3≥D4≥D5. The fourth cylinder unit is next to the third cylinder unit, and the fifth cylinder unit is next to the fourth cylinder unit.

According to some embodiments of the present disclosure, the first cylinder unit, the second cylinder unit, and the third cylinder unit have the same height.

According to some embodiments of the present disclosure, the deflector includes a first quartz having a first oblique surface and a first bottom surface, a second quartz having a second oblique surface and a second bottom surface, a third quartz having a third oblique surface and a third bottom surface, and the first bottom surface, the second bottom surface, and the third bottom surface are parallel to each other. The first quartz has a first angle θ1 between the first oblique surface and the first bottom surface, the second quartz has a second angle θ2 between the second oblique surface and the second bottom surface, the third quartz has a third angle θ3 between the third oblique surface and the third bottom surface, and θ1<θ2<θ3. A first dichroic filter is disposed on the first oblique surface, a second dichroic filter is disposed on the second oblique surface, and a third dichroic filter is disposed on the third oblique surface.

According to some embodiments of the present disclosure, the second angle θ2 is 45 degrees.

According to some embodiments of the present disclosure, the optical system further includes a light absorber disposed aside the deflector.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 12, FIG. 13, and FIG. 14 are cross-sectional views of a deflector in accordance with some alternative embodiments of the present disclosure.

FIG. 18 is a partial top view of the pair of smart glasses in FIG. 1.

DETAILED DESCRIPTION

Figure 1:
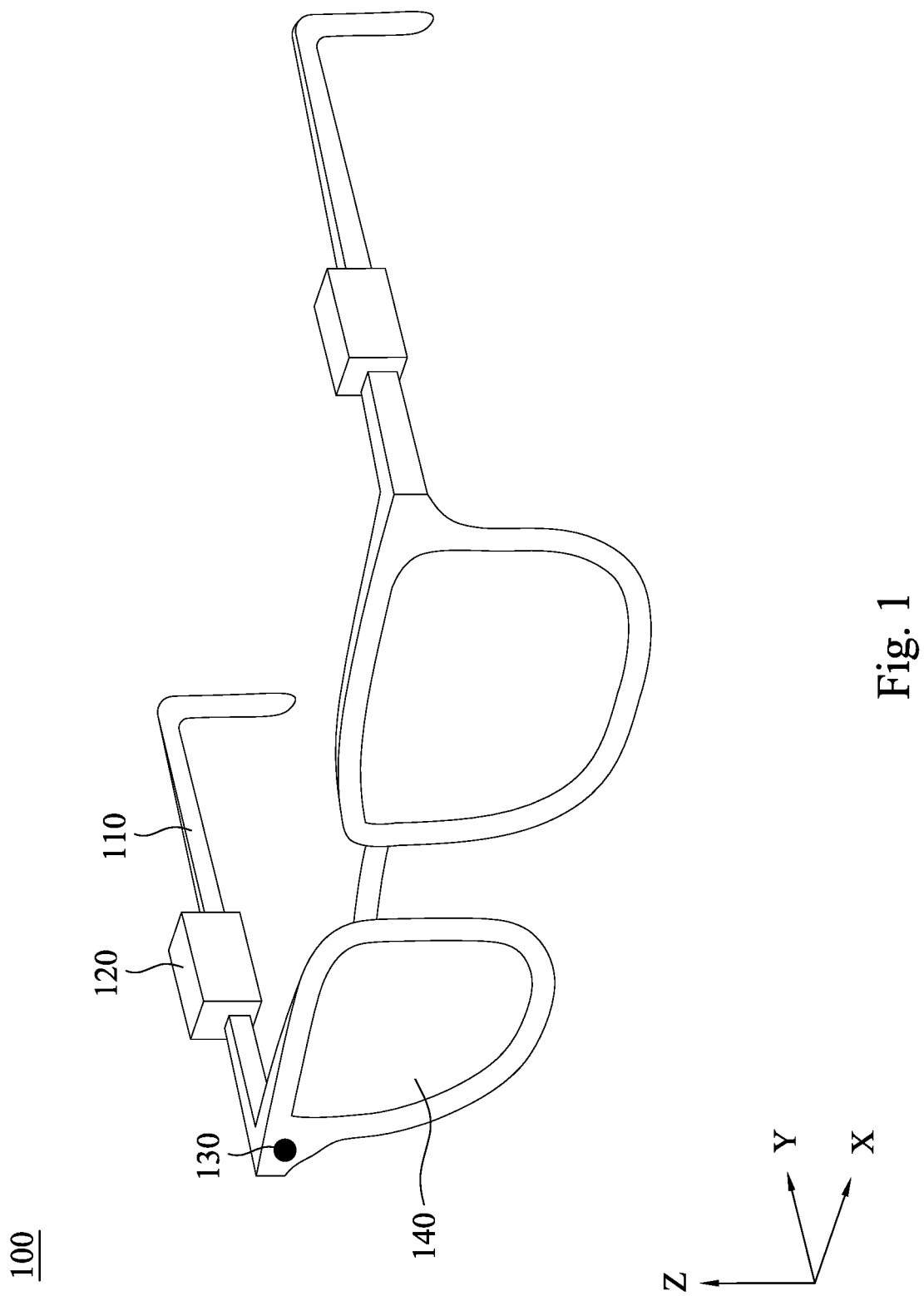
FIG. 1 is a schematic view of a pair of smart glasses in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. It should be understood that the number of any elements/components is merely for illustration, and it does not intend to limit the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Still further, when a number or a range of numbers is described with "about", "approximate," and the like, the term is intended to encompass numbers that are within a reasonable range including the number described, such as within +/−10% of the number described or other values as understood by person skilled in the art. For example, the term "about 5 nm" encompasses the dimension range from 4.5 nm to 5.5 nm.

Hereinafter, several embodiments of the present invention will be disclosed with the accompanying drawings. Many practical details will be described in the following description for a clear description. However, it should be understood that these practical details should not be used to limit the present invention. That is, in some embodiments of the present invention, these practical details are unnecessary. In addition, in order to simplify the drawings, some conventional structures and elements will be shown in the drawings in a simple schematic manner.

When a beam enters into a light-guide lens or a glass through various optical elements, RGB lights would have different optical paths. Therefore, the RGB lights transmission to the viewer's eyes will shift. In order to solve this transmission imaging problem caused by the RGB lights having different optical paths, a plurality of grating coupler and/or a plurality of optical elements were used to achieve the same optical paths for imaging. For example, three separate high refractive index glasses were used for separately multiplexing three wavelengths (such as RGB wavelengths of lights) of an external light, and each of the glasses had at least one grating coupler, thereby transmitting the RGB wavelengths along the same optical paths. However, three separate high refractive index glasses would increase the thickness of the optical device and also increase the cost of manufacturing the optical device.

The optical systems of the present disclosure adjusts incident angles of three separated RGB images emitted from different positions, and then couple the RGB images with one deflector, one grating coupler, and one light-guide lens. In addition, the present disclosure provides optical systems including variation structures of a deflector. The deflector could include a meta-grating structure having multiple longitudinal units, a meta-grating structure having multiple cylinder units, a n-step grating structure, a blazed grating structure, a slanted grating structure. The deflector also could include three quartz cubes with a blue dichroic filter, a green dichroic filter, and a red dichroic filter. The optical system of the present disclosure could reduce the thickness of an optical device and provide high efficiencies of RGB lights (images). The present disclosure may be applied in smart glasses such as augmented reality (AR) and virtual reality (VR).

FIG. 1 is a schematic view of a pair of smart glasses 100 in accordance with some embodiments of the present disclosure. The pair of smart glasses 100 includes an arm 110, an optical device 120, a grating coupler structure 130, and a light-guide lens 140. The arm 110 and the optical device 120 extend along a direction Y, and the optical device 120 is disposed in the arm 110. The grating coupler structure 130 is disposed around an end of the arm 110. The light-guide lens 140 extends along a direction X.

Figure 2:
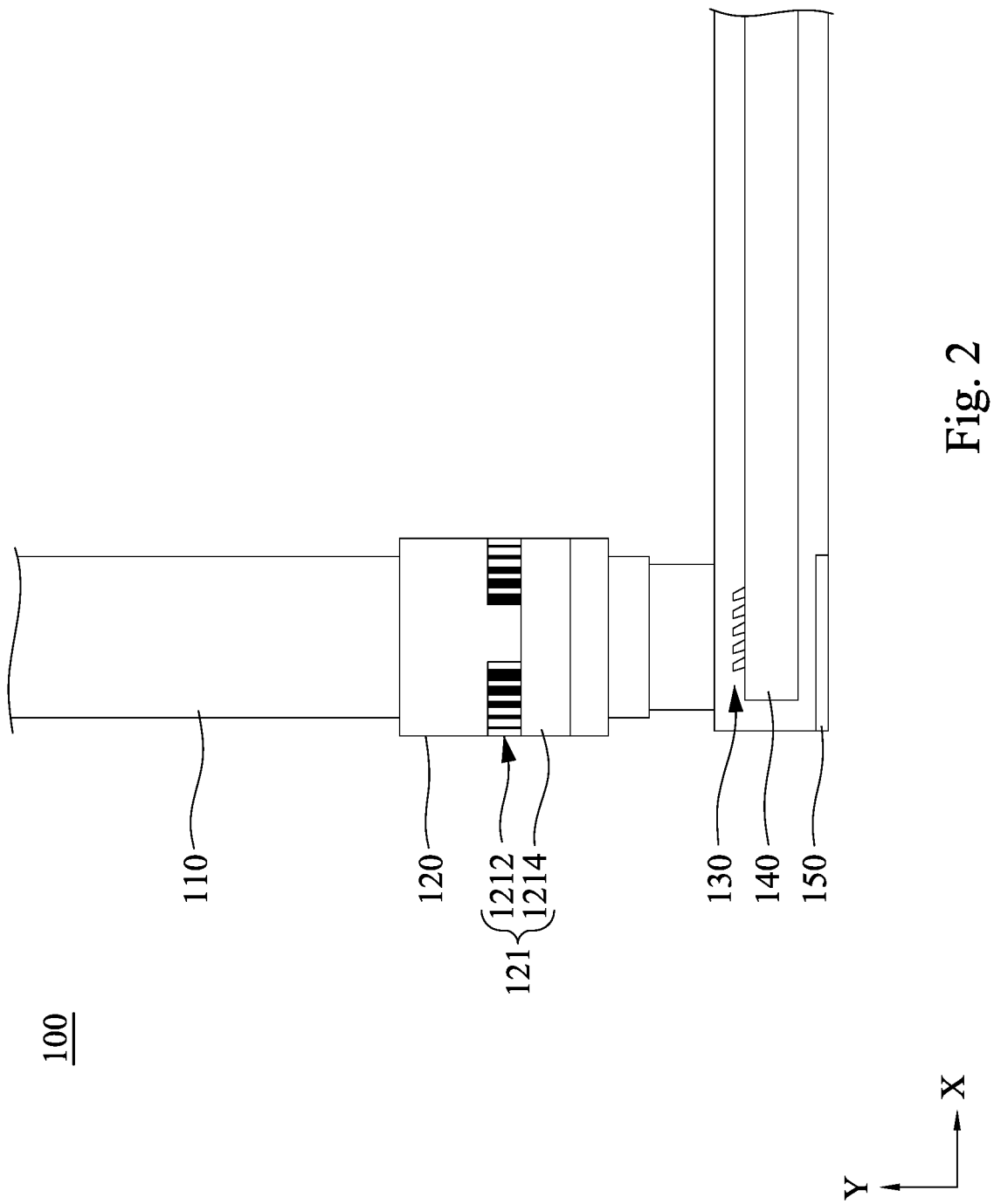
FIG. 2 is a partial top view of the pair of smart glasses in FIG. 1.

FIG. 2 is a partial top view of the pair of smart glasses 100 in FIG. 1. The optical device 120 includes several elements. FIG. 2 merely illustrates a deflector 121 including a grating structure 1212 and a substrate 1214 for clarity. The detailed drawing of the optical device 120 will be discussed in FIG. 3 below. The grating coupler structure 130 is disposed at the intersection of the end of the arm 110 and the end of the light-guide lens 140. Specifically, the grating coupler structure 130 is disposed on a surface of the light-guide lens 140.

Figure 3:
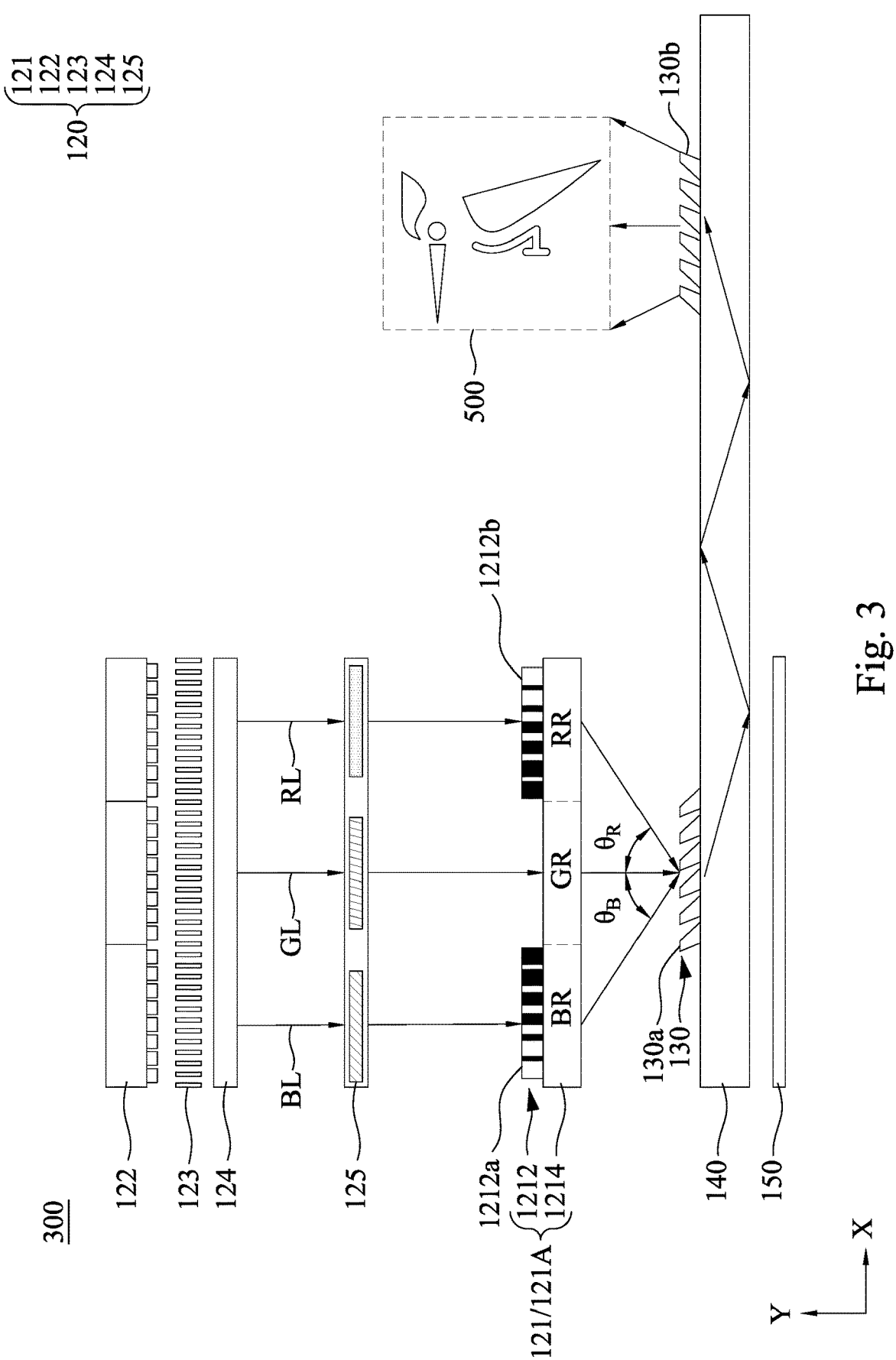
FIG. 3 is a schematic view of an optical system in accordance with some embodiments of the present disclosure.

FIG. 3 is a schematic view of an optical system 300 in accordance with some embodiments of the present disclosure. The optical system 300 includes a projector 122, a polarizer 123, a collimator 124, a filter 125, the deflector 121, the grating coupler structure 130, the light-guide lens 140, and a light absorber 150. The projector 122 could emit three beams having different wavelengths. Specifically, the three beams extend along the direction Y. The beams emitting from the projector 122 are not limited to three beams, and it also may emit polychromatic light. The three beams may be a blue light BL, a green light GL, and a red light RL. It should be understood that "the three beams" below refer to the blue light BL, the green light GL, and the red light RL. The projector 122 is configured to decouple an overlapped colored image 500 (please refer to FIG. 5D) into three separated RGB images (please refer to FIG. 5A to FIG. 5C). In some embodiments, the projector 122 may be an organic light-emitting diode (OLED) projector so that the blue light BL, the green light GL, and the red light RL may be broadband lights. The polarizer 123 is disposed below the projector 122. Specifically, the polarizer 123 is disposed between the projector 122 and the deflector 121. The polarizer 123 is configured to filter out transverse electric (TE) modes or transverse magnetic (TM) modes of the three beams emitting from the projector 122. The collimator 124 is disposed below the polarizer 123 and is configured to confine incident angles of the three beams emitting from the projector 122. The filter 125 is disposed below the collimator 124 and is configured to narrow the wavebands of the three beams emitting from the projector 122. In some embodiments, the filter 125 includes a blue narrow bandpass filter for the blue light BL, a green narrow bandpass filter for the green light GL, and a red narrow bandpass filter for the red light RL. In some embodiments, the arranged sequence of the polarizer 123, the collimator 124, and the filter 125 may be interchangeable.

Figure 4:
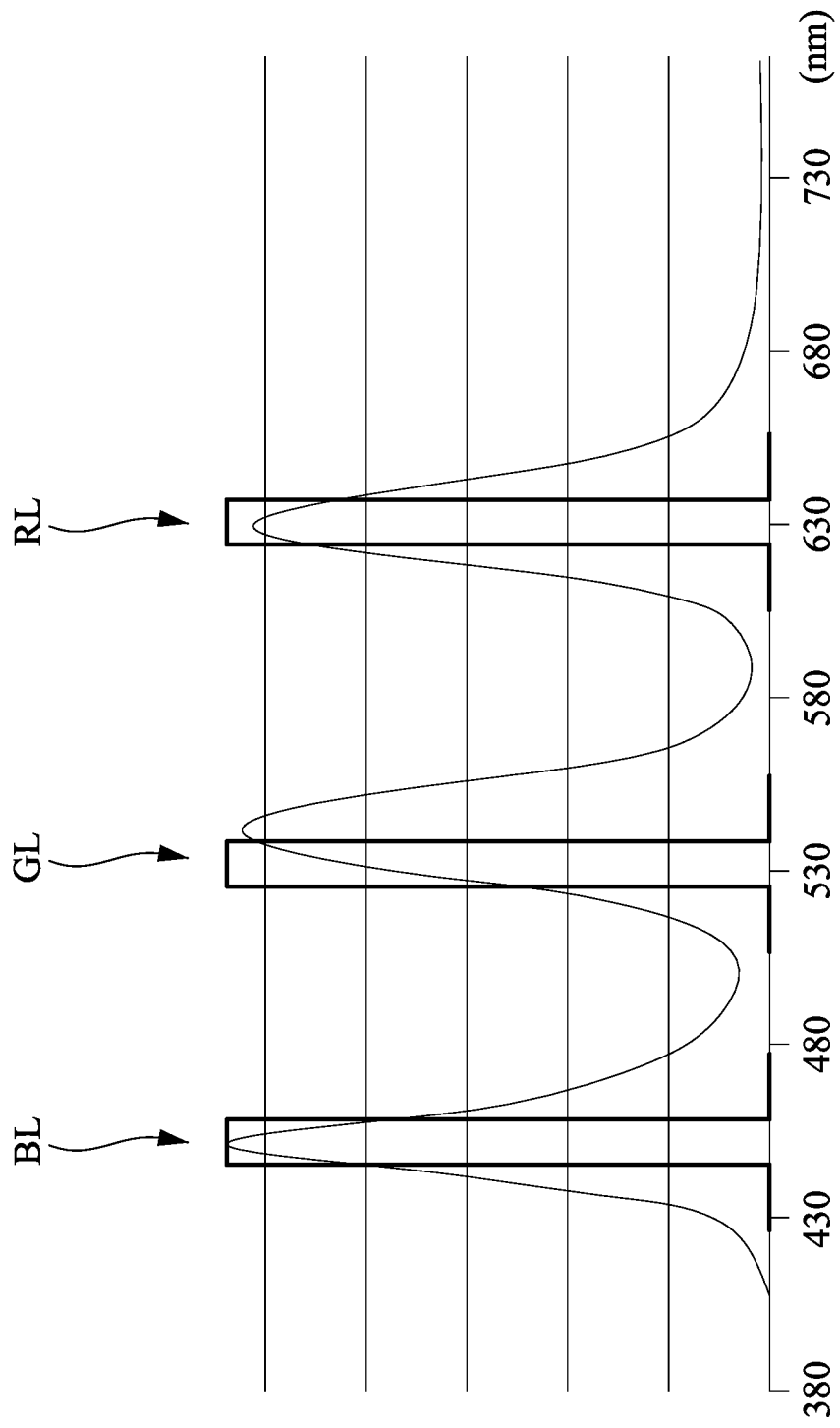
FIG. 4 is a schematic view of wavebands of the three beams emitting from the projector after the three beams transmitting through a filter in FIG. 3.

FIG. 4 is a schematic view of wavebands of the three beams emitting from the projector 122 after the three beams transmitting through the filter 125 in FIG. 3. Specifically, after the blue light BL, the green light GL, and the red light RL transmitting through the filter 125, wavebands of the blue light BL, the green light GL, and the red light RL will be narrowed. In some embodiments, after the blue light BL transmitting through the filter 125, the wavelength of the blue light BL may be in a range from 430 nm to 491 nm, such as about 440, 446, 457, 465, 473, or 488 nm. In some embodiments, after the green light GL transmitting through the filter 125, the wavelength of the green light GL may be in a range from 510 nm to 581 nm, such as about 515, 520, 532, 543, or 560 nm. In some embodiments, after the red light RL transmitting through the filter 125, the wavelength of the red light RL may be in a range from 590 nm to 671 nm, such as about 630, 633, 637, or 658 nm. It is understood that the blue light BL, the green light GL, and the red light RL shown in FIG. 3 also may include other color lights. In some embodiments, the blue light BL, the green light GL, and the red light RL include three separated RGB images.

Please refer to FIG. 3 again. The deflector 121 is disposed below the filter 125. The deflector 121 includes the grating structure 1212 and the substrate 1214. The grating structure 1212 is disposed on the substrate 1214. The substrate 1214 includes a blue region BR, a green region GR, and a red region RR. The blue region BR and the red region RR are separated by the green region GR, as shown in FIG. 3. The grating structure 1212 includes a first grating deflector structure 1212a disposed on the blue region BR of the substrate 1214 and a second grating deflector structure 1212b disposed on the red region RR of the substrate 1214. In other words, there are no any grating structures disposed on the green region GR of the substrate 1214. It should be understood that the grating structure 1212 shown in FIG. 2 and FIG. 3 merely illustrates for clarity. The detailed arrangements of the grating structure 1212 will be discussed in FIG. 6 to FIG. 14, and the variation structures of the grating structure 1212 will be discussed in FIG. 17A to FIG. 17C. In some embodiments, a refractive index of each of the first grating deflector structure 1212a and the second grating deflector structure 1212b is in a range from 1.7 to 3.5, such as 1.8, 2.2, 2.6, 3.0, or 3.4. In some embodiments, each of the first grating deflector structure 1212a and the second grating deflector structure 1212b may be made by $Al_2O_3$, $TiO_2$, $Nb_2O_5$, $Si_3N_4$, or $Ta_2O_5$. In some embodiments, the substrate 1214 may be transparent substrate and may be made of glass, fused silica, sapphire, ceramic, polymer resin, or plastic. In some embodiments, a refractive index of the substrate 1214 may be in a range from 1.3 to 2.0, such as 1.4, 1.5, 1.7, or 1.9.

In FIG. 3, the grating coupler structure 130 and the light-guide lens 140 are disposed below the deflector 121. The grating coupler structure 130 includes a first grating coupler structure 130a and a second grating coupler structure 130b. The first grating coupler structure 130a and the second grating coupler structure 130b are connected to the light-guide lens 140. The first grating coupler structure 130a is below the deflector 121 and is configured to couple the three beams (such as the blue light BL, the green light GL, and the red light RL) into the light-guide lens 140, such that the three beams travel the same optical path within the light-guide lens 140. The light-guide lens 140 is configured to transmit the three beams. The deflector 121 is configured to change incident angles of the three beams and to focus the three beams at the same region of the first grating coupler structure 130a of the grating coupler structure 130. Specifically, after the blue light BL passes through the deflector 121, a blue deflected angle $\theta_B$ of the blue light BL to the first grating coupler structure 130a is formed. Similarity, after the red light RL passes through the deflector 121, a red deflected angle $\theta_R$ of the red light RL to the first grating coupler structure 130a is formed. The second grating coupler structure 130b of the grating coupler structure 130 is disposed on the light-guide lens 140 and is configured to enable the three beams departing from the light-guide lens 140 after the three beams have traveled the same optical path. In some embodiments, the structure and the material of the first grating coupler structure 130a are the same as the second grating coupler structure 130b. In some embodiments, the light absorber 150 is disposed below the grating coupler structure 130. In some embodiments, the light absorber 150 is optional. The light absorber 150 is configured to absorb non-ideal lights, such as zero-order light or higher-order diffraction lights (of the blue light BL, the green light GL, and the red light RL) other than the first-order diffraction lights.

Figure 5C:
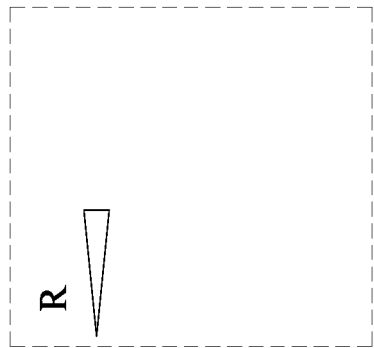
FIG. 5A, FIG. 5B, and FIG. 5C are schematic views of original images of three separated beams.
Figure 5B:
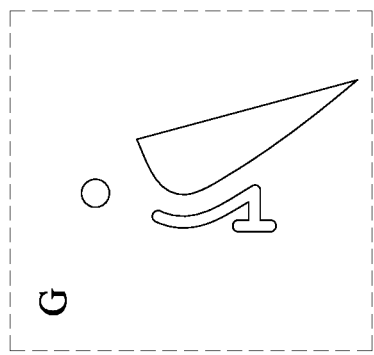
Figure 5D:
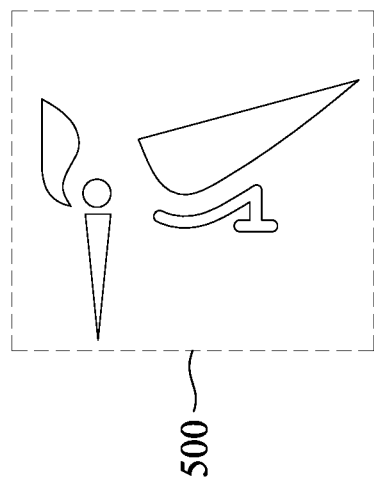
FIG. 5D is a schematic view of an optical image of the overlapped colored image.
Figure 5A:
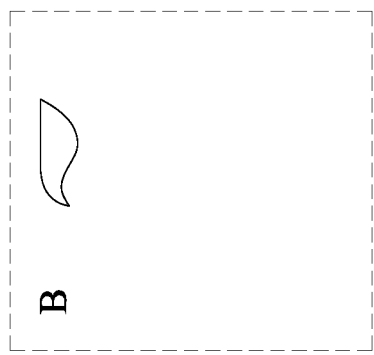

FIG. 5A, FIG. 5B, and FIG. 5C are schematic views of original images of three separated beams (the blue light BL, the green light GL, and the red light RL). FIG. 5D is a schematic view of an optical image of the overlapped colored image 500. Specifically, please refer to FIG. 3, after the three beams transmit through the deflector 121, the three beams would change their travel directions, and then the three beams would focus on the same region of the first grating coupler structure 130a of the grating coupler structure 130. Therefore, the three beams couple into the light-guide lens 140. Next, the three beams would travel the same optical path within the light-guide lens 140 along the direction X. Finally, the three beams would couple out through the second grating coupler structure 130b of the grating coupler structure 130, so that the three beams are separated to form the overlapped colored image 500 shown in FIG. 5D.

Figure 6:
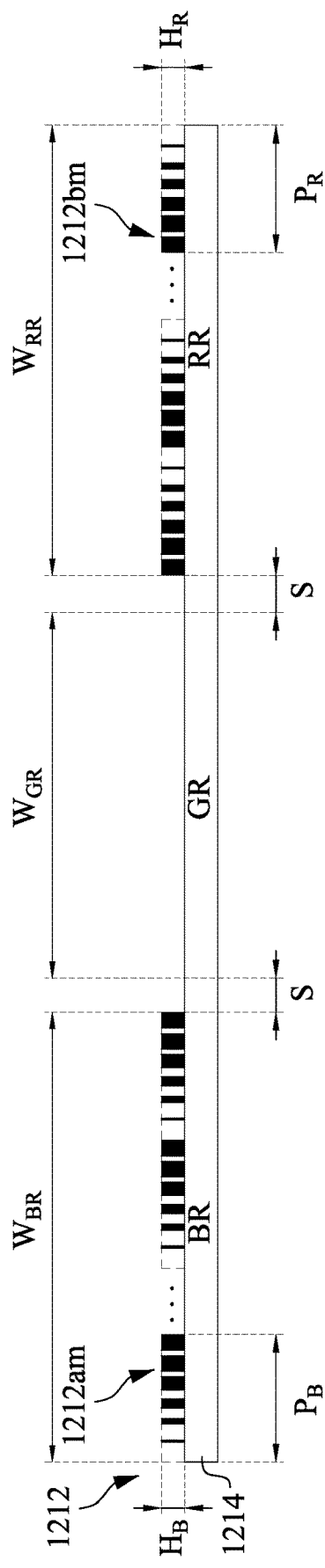
FIG. 6 is an enlargement view of the deflector in FIG. 3.

FIG. 6 is an enlargement view of the deflector 121 in FIG. 3. Both the first grating deflector structure 1212a and the second grating deflector structures 1212b of the grating structure 1212 shown in FIG. 6 are meta-grating structures. In other words, the first grating deflector structure 1212a in FIG. 3 could be understood as the first meta-grating structure 1212am in FIG. 6, and the second grating deflector structure 1212b in FIG. 3 could be understood as the second meta-grating structure 1212bm in FIG. 6. It should be understood that the "meta-grating structure" herein means the units in the grating structure are different and widths of the units are increased or decreased regularly. As shown in FIG. 6, a plurality of first meta-grating structures 1212am are disposed on the blue region BR of the substrate 1214. In some embodiments, the number of the first meta-grating structures 1212am is in a range from 125 to 8000, for example, about 200 to 4000. In some embodiments, a period $P_B$ of the first meta-grating structure 1212am is in a range from 1000 to 8000 nm, for example, about 2000 to 5000 nm. In some embodiments, a height $H_B$ of the first meta-grating structure 1212am is in a range from 20 to 2000 nm, for example, about 100 to 1000 nm. Similarity, a plurality of second meta-grating structures 1212bm are disposed on the red region RR of the substrate 1214. In some embodiments, the number of the second meta-grating structures 1212bm is in a range from 125 to 8000, for example, about 200 to 4000. In some embodiments, a period PR of the second meta-grating structure 1212bm is in a range from 1000 to 8000 nm, for example, about 2000 to 5000 nm. In some embodiments, a height HR of the second meta-grating structure 1212bm is in a range from 20 to 2000 nm, for example, about 100 to 1000 nm. In some embodiments, each of a width $W_{BR}$ of the blue region BR, a width $W_{GR}$ of the green region GR, and a width $W_{RR}$ of the red region RR of the substrate 1214 is in a range from 1 to 8 mm. In some embodiments, a spacing S between the blue region BR and the green region GR, and a spacing S between the green region GR and the red region RR are in a range from 100 nm to 2 mm, for example, about 10 to 200 μm.

Figure 7:
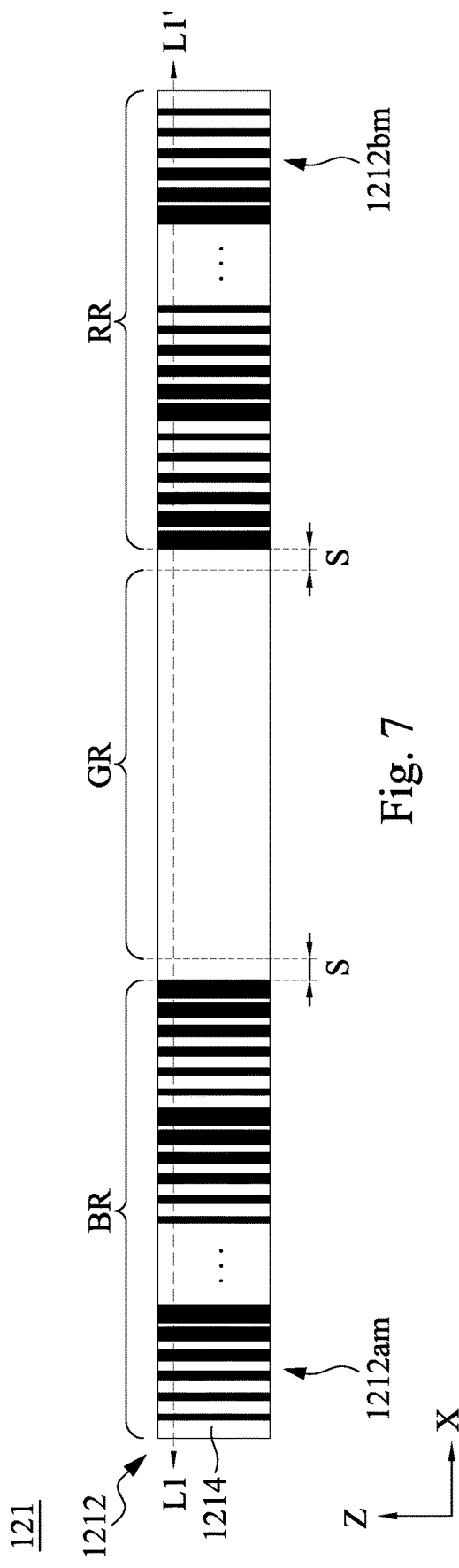
FIG. 7 and FIG. 8 are top views of the deflector in FIG. 6 in accordance with some embodiments of the present disclosure.
Figure 8:
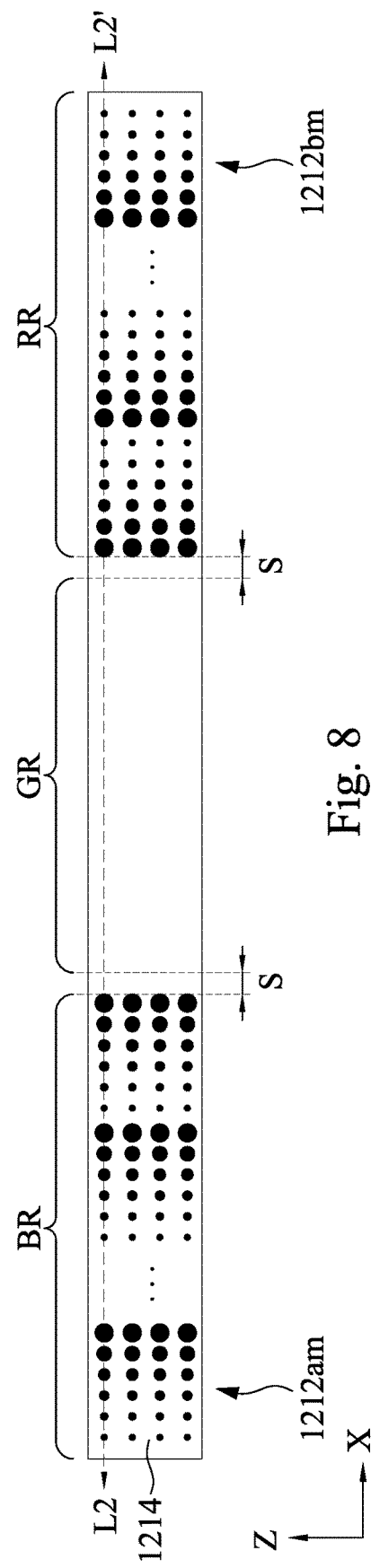

FIG. 7 and FIG. 8 are top views of the deflector 121, 121A in FIG. 6 in accordance with some embodiments of the present disclosure. Specifically, the view along a line L1-L1' of the deflector 121 in FIG. 7 is FIG. 6, and the view along a line L2-L2' of the deflector 121A in FIG. 8 also is FIG. 6. Please refer to FIG. 7, the shapes of the first meta-grating structure 1212am and the second meta-grating structure 1212bm of the grating structure 1212 are longitudinal. Please refer to FIG. 8, the shapes of the first meta-grating structure 1212am and the second meta-grating structure 1212bm of the grating structure 1212 are cylinders. Whether the deflector 121 in FIG. 7 or the deflector 121A in FIG. 8, the cross-sectional views are the same, as shown in FIG. 6.

Figure 9B:
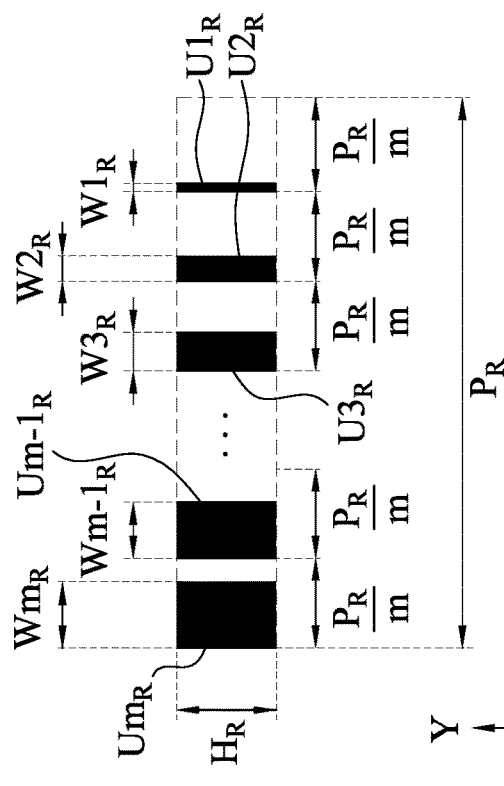
FIG. 9A and FIG. 9B respectively are enlargement views of a first meta-grating structure and a second meta-grating structure in FIG. 6.
Figure 9A:
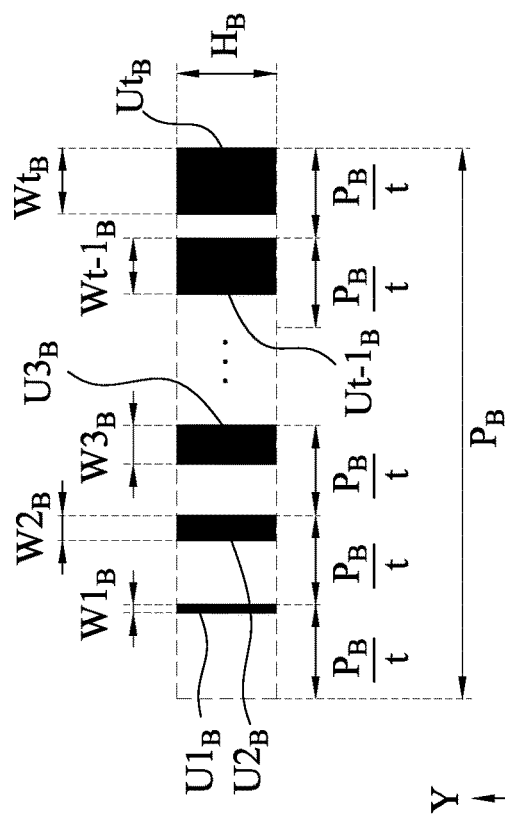

FIG. 9A and FIG. 9B respectively are enlargement views of the first meta-grating structure 1212am and the second meta-grating structure 1212bm in FIG. 6. Please refer to FIG. 9A, the first meta-grating structure 1212am includes a first longitudinal unit $U1_B$ having a first width $W1_B$, a second longitudinal unit $U2_B$ having a second width $W2_B$, a third longitudinal unit $U3_B$ having a third width $W3_B$, a $t-1^{th}$ longitudinal unit $Ut-1_B$ having a $t-1^{th}$ width $Wt-1_B$, a $t^{th}$ longitudinal unit $Ut_B$ having a $t^{th}$ width $Wt_B$, and $W1_B \leq W2_B \leq W3_B \leq Wt-1_B \leq Wt_B$. In other words, the plurality of longitudinal units of the first meta-grating structure 1212am are gradational in width. The first meta-grating structure 1212am could include t longitudinal units, and t≥4, such as 5, 6, 8, or 10. Specifically, the period $P_B$ of the first meta-grating structure 1212am and the number t define a pitch $P_B/t$, as shown in FIG. 9A. Please refer to FIG. 6 and FIG. 9A, the first longitudinal unit $U1_B$, the second longitudinal unit $U2_B$, and the third longitudinal unit $U3_B$ sequentially are disposed along an outer surface of the blue region BR of the substrate 1214 to an inner surface of the blue region BR of the substrate 1214.

Please refer to FIG. 9B, the second meta-grating structure 1212bm includes a first longitudinal unit $U1_R$ having a first width $W1_R$, a second longitudinal unit $U2_R$ having a second width $W2_R$, a third longitudinal unit $U3_R$ having a third width $W3_R$, a $m-1^{th}$ longitudinal unit $Um-1_R$ having a $m-1^{th}$ width $Wm-1_R$, a $m^{th}$ longitudinal unit $Um_R$ having a m width $Wm_R$, and $W1_R \leq W2_R \leq W3_R \leq Wm-1_R \leq Wm_R$. In other words, the plurality of longitudinal units of the second meta-grating structure 1212bm are gradational in width. The second meta-grating structure 1212bm could include m longitudinal units, and m Z 4, such as 5, 6, 8, or 10. Specifically, the period $P_R$ of the second meta-grating structure 1212bm and the number m define a pitch $$\frac{P_R}{m},$$

as shown in FIG. 9B. Please refer to FIG. 6 and FIG. 9B, the first longitudinal unit $U1_R$, the second longitudinal unit $U2_R$, and the third longitudinal unit $U3_R$ sequentially are disposed along an outer surface of the red region RR of the substrate 1214 to an inner surface of the red region RR of the substrate 1214.

Figure 10A:
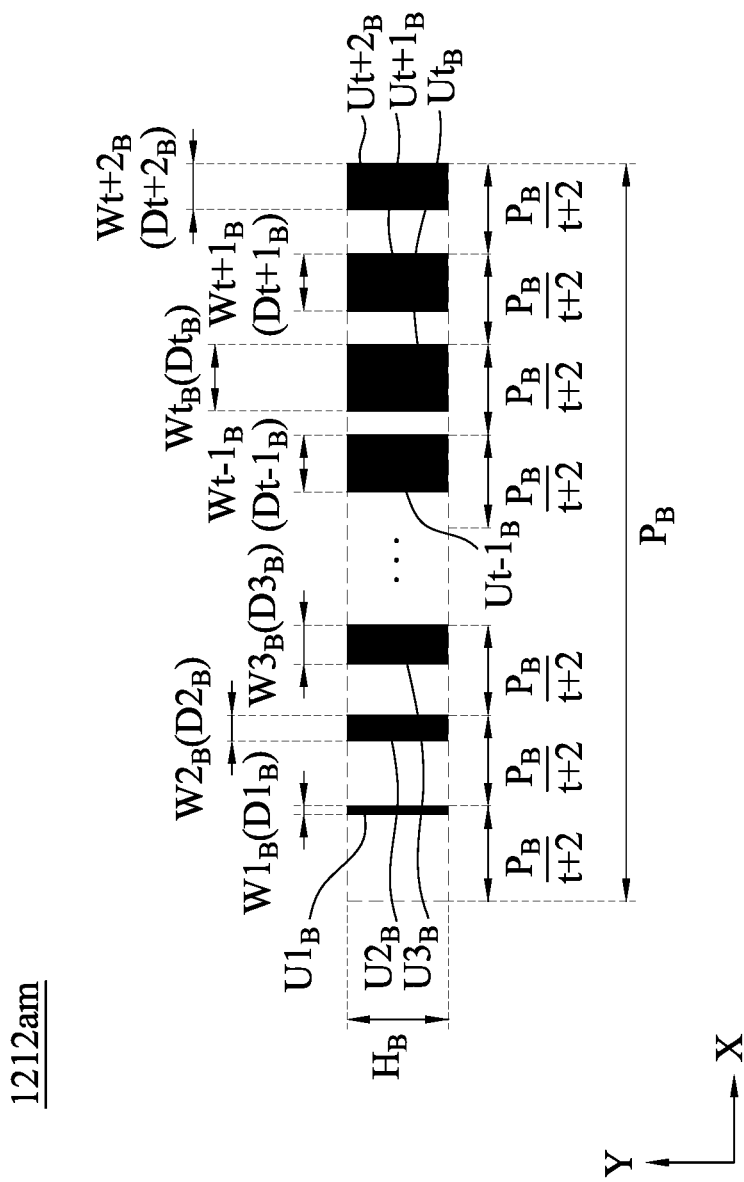
FIG. 10A and FIG. 10B respectively are enlargement views of variation structures for the first meta-grating structure and the second meta-grating structure in FIG. 9A and FIG. 9B.
Figure 10B:
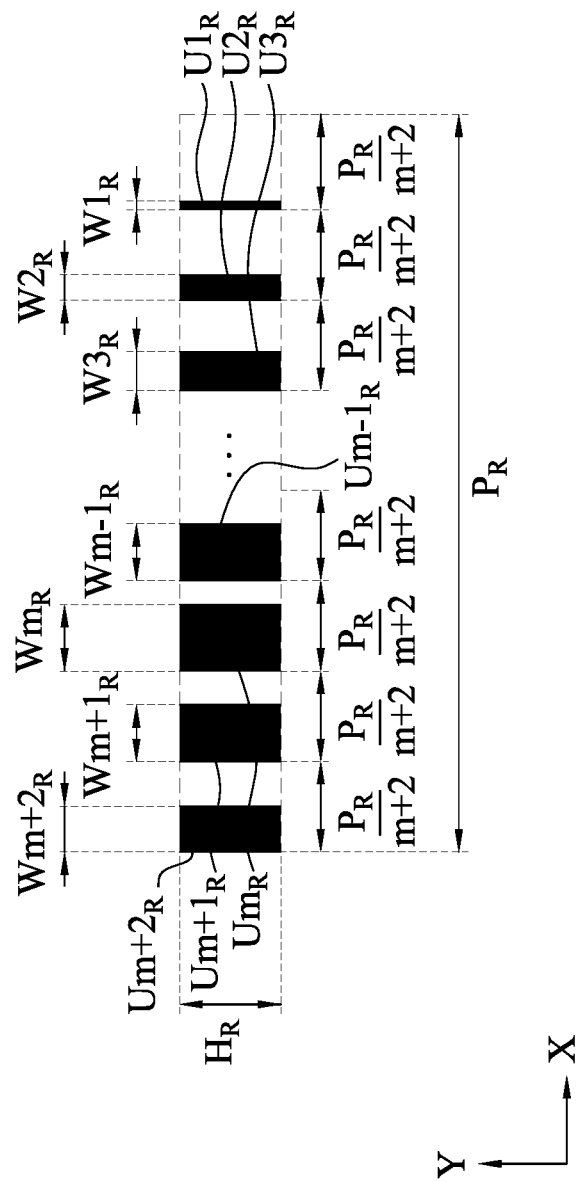

FIG. 10A and FIG. 10B respectively are enlargement views of variation structures for the first meta-grating structure 1212am and the second meta-grating structure 1212bm in FIG. 9A and FIG. 9B. Same features are labeled by the same numerical references, and descriptions of the same features are not repeated in the following figures. The differences between FIG. 9A and FIG. 10A are that the first meta-grating structure 1212am in FIG. 10A further includes a $t+1^{th}$ longitudinal unit $Ut+1_B$ having a $t+1^{th}$ width $Wt+1_B$ and a $t+2^{th}$ longitudinal unit $Ut+2_B$ having a $t+2^{th}$ width $Wt+2_B$, in which $Wt_B \geq Wt+1_B \geq Wt+2_B$. The $t+1^{th}$ longitudinal unit $Ut+1_B$ is next to the $t^{th}$ longitudinal unit $Ut_B$, and the $t+2^{th}$ longitudinal unit $Ut+2_B$ is next to the $t+1^{th}$ longitudinal unit $Ut+1_B$.

The differences between FIG. 9B and FIG. 10B are that the second meta-grating structure 1212bm in FIG. 10B further includes a $m+1^{th}$ longitudinal unit $Um+1_R$ having a $m+1^{th}$ width $Wm+1_R$ and a $m+2^{th}$ longitudinal unit $Um+2_R$ having a $m+2^{th}$ width $Wm+2_R$, in which $Wm_R \geq Wm+1_R \geq Wm+2_R$. The $m+1^{th}$ longitudinal unit $Um+1_R$ is next to the $m^{th}$ longitudinal unit $Um_R$, and the $m+2^{th}$ longitudinal unit $Um+2_R$ is next to the $m+1^{th}$ longitudinal unit $Um+1_R$.

Figure 11:
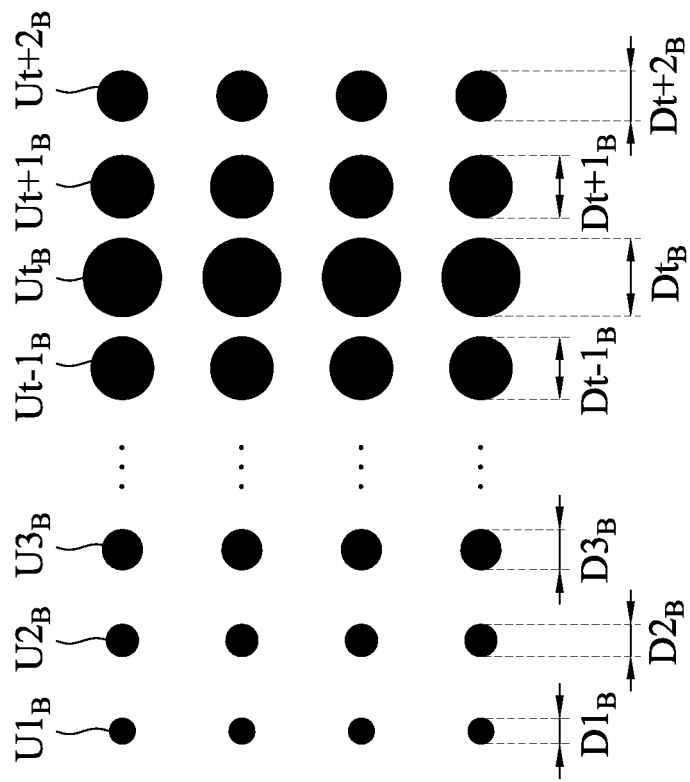
FIG. 11 is a top view of a variation structure of the first meta-grating structure of the deflector in FIG. 8.

FIG. 11 is a top view of a variation structure of the first meta-grating structure 1212am of the deflector 121A in FIG. 8. Specifically, the cross-sectional view of the first meta-grating structure 1212am in FIG. 11 could refer to the FIG. 10A. The first meta-grating structure 1212am in FIG. 11 are cylinders and has a plurality of circle shapes when viewed from X-Z section. As shown in FIG. 11, the first meta-grating structure 1212am includes a first cylinder unit $U1_B$ having a first diameter $D1_B$, a second cylinder unit $U2_B$ having a second diameter $D2_B$, a third cylinder unit $U3_B$ having a diameter width $D3_B$, a $t-1^{th}$ cylinder unit $Ut-1_B$ having a $t-1^{th}$ diameter $Dt-1_B$, a $t^{th}$ cylinder unit $Ut_B$ having a $t^{th}$ diameter $Dt_B$, and $D1_B \leq D2_B \leq D3_B \leq Dt-1_B \leq Dt_B$. The first meta-grating structure 1212am in FIG. 11 further includes a $t+1^{th}$ cylinder unit $Ut+1_B$ having a $t+1^{th}$ diameter $Dt+1_B$ and a $t+2^{th}$ cylinder unit $Ut+2_B$ having a $t+2^{th}$ diameter $Dt+2_B$, in which $Dt_B \geq Dt+1_B \geq Dt+2_B$. The $t+1^{th}$ cylinder unit $Ut+1_B$ is next to the $t^{th}$ cylinder unit $Ut_B$, and the $t+2^{th}$ cylinder unit $Ut+2_B$ is next to the $t+1^{th}$ cylinder unit $Ut+1_B$. It is understood that the arrangements and positions of the first meta-grating structure 1212am in FIG. 11 could be similar to the arrangements positions of the first meta-grating structure 1212am in FIG. 8, and the details thereof are not repeatedly described. In addition, a variation structure of the second meta-grating structure 1212bm could be a mirror structure in a lateral symmetry of the first meta-grating structure 1212am shown in FIG. 11.

Please refer to FIG. 6, FIG. 9A, and FIG. 9B again. All of the longitudinal/cylinder units $U1_B$, $U2_B$, $U3_B$, $Ut-1_B$, $Ut_B$ have the same height $H_B$. All of the longitudinal/cylinder units $U1_R$, $U2_R$, $U3_R$, $Um-1_R$, $Um_R$ have the same height HR. In some embodiments, as shown in FIG. 6, the height $H_B$ of the first meta-grating structure 1212am is the same as the height HR of the second meta-grating structure 1212bm. In some embodiments, the period $P_B$ of the first meta-grating structure 1212am is the same as the period PR of the second meta-grating structure 1212bm, as shown in FIG. 6.

FIG. 12, FIG. 13, and FIG. 14 are cross-sectional views of a deflector 121B, 121C, 121D in accordance with some alternative embodiments of the present disclosure. In some embodiments, as shown in the deflector 121B of FIG. 12, the height $H_B$ of the first meta-grating structure 1212am is different from the height $H_R$ of the second meta-grating structure 1212bm. In some embodiments, as shown in the deflector 121C of FIG. 13 and the deflector 121D of FIG. 14, the period $P_B$ of the first meta-grating structure 1212am is different from the period $P_R$ of the second meta-grating structure 1212bm. Specifically, in FIG. 13, the number of the longitudinal units of the first meta-grating structure 1212am is greater than the number of the longitudinal units of the second meta-grating structure 1212bm. In FIG. 14, the pitch between the longitudinal units of the first meta-grating structure 1212am is smaller than the pitch $$\frac{P_R}{t}$$

between the longitudinal units of the second meta-grating structure 1212bm.

Figure 15:
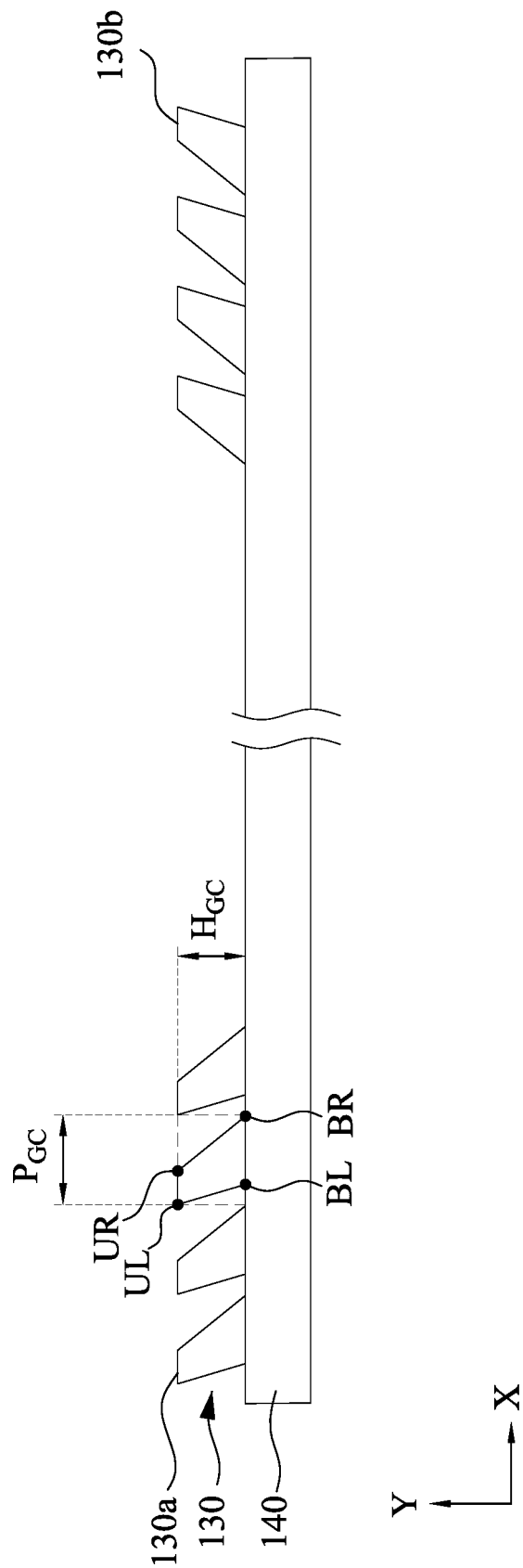
FIG. 15 is a cross-sectional view of the light-guide lens with the grating coupler structure in FIG. 3.

FIG. 15 is a cross-sectional view of the light-guide lens 140 with the grating coupler structure 130 in FIG. 3. The grating coupler structure 130 includes the first grating coupler structure 130a and the second grating coupler structure 130b. The grating coupler structure 130 shown in FIG. 15 is a slanted grating coupler structure. Specifically, the grating coupler structure 130 is defined by the positons of a bottom left point BL, a bottom right point BR, an upper left point UL, and an upper right point UR. In some embodiments, a period $P_{GC}$ of the grating coupler structure 130 is in a range from 300 nm to 500 nm. In some embodiments, a height $H_{GC}$ of the grating coupler structure 130 is in a range from 100 nm to 600 nm. In some embodiments, a refractive index of the grating coupler structure 130 is in a range from 1.7 to 3.5, such as 1.8, 2.5, 2.9, or 3.4. In some embodiments, a refractive index of the light-guide lens 140 is the same as or similar to a refractive index of the grating coupler structure 130.

Please refer to Tables 1-3 below and FIG. 3, FIG. 7, and FIG. 15. It shows experimental example 1 under the conditions that the shapes of the first meta-grating structure 1212am and the second meta-grating structure 1212bm of the grating structure 1212 are longitudinal, and the filter 125 is under the TM mode.

TABLE 1 meta-grating structures of the deflector

| TM | blue light = 488 nm | green light = 532 nm | red light = 620 nm |
|---|---|---|---|
| $\frac{P_B}{t}$ or $\frac{P_R}{m}$ | 596.1 nm | — | 504.9 nm |
| $W1_B$ or $W1_R$ | 154.9 nm | — | 0 nm |
| $W2_B$ or $W2_R$ | 174.9 nm | — | 0 nm |
| $W3_B$ or $W3_R$ | 190.2 nm | — | 120.2 nm |
| $W4_B$ or $W4_R$ | 249.9 nm | — | 158.9 nm |
| $W5_B$ or $W5_R$ | 390.7 nm | — | 196.8 nm |
| $W6_B$ or $W6_R$ | 428.5 nm | — | 248.5 nm |
| $W7_B$ or $W7_R$ | 477.5 nm | — | 331.8 nm |
| $H_B$ or $H_R$ | 791.5 nm | — | 770.7 nm |
| $\theta_B$ or $\theta_R$ | 5.87° | — | 11.81° |

TABLE 2 slanted grating coupler structure

| refractive index (n) | 1.9 |
|---|---|
| $P_{GC}$ | 430 nm |
| bottom left point BL | −77.5 nm |
| bottom right point BR | 115 nm |

TABLE 2-continued slanted grating coupler structure

| refractive index (n) | 1.9 |
|---|---|
| upper left point UL | −213.8 nm |
| upper right point UR | −15.4 nm |
| $H_{GC}$ | 500 nm |

TABLE 3

| efficiency | | | |
|---|---|---|---|
| TM | blue light | green light | red light |
| deflector | 76.79% | 100% | 85.03% |
| slanted grating coupler structure | 80.77% | 95.59% | 72.94% |
| total | 62.02% | 95.59% | 62.02% |

In the experimental example 1, it can be seen from Table 3 that the total efficiency of the blue light BL was 62.02%, the total efficiency of the green light GL was 95.59%, and the total efficiency of the red light RL was 62.02%. It is considered that this example had good efficiencies of RGB lights.

Please refer to Tables 4-6 below and FIG. 3, FIG. 7, and FIG. 15. It shows experimental example 2 under the conditions that the shapes of the first meta-grating structure 1212am and the second meta-grating structure 1212bm of the grating structure 1212 are longitudinal, and the filter 125 is under the TE mode.

TABLE 4 meta-grating structures of the deflector

| TE | blue light = 488 nm | green light = 532 nm | red light = 620 nm |
|---|---|---|---|
| $\frac{P_B}{t}$ or $\frac{P_R}{m}$ | 596.1 nm | — | 504.9 nm |
| $W1_B$ or $W1_R$ | 120.0 nm | — | 120.2 nm |
| $W2_B$ or $W2_R$ | 120.0 nm | — | 120.3 nm |
| $W3_B$ or $W3_R$ | 122.8 nm | — | 444.8 nm |
| $W4_B$ or $W4_R$ | 336.9 nm | — | 394.5 nm |
| $W5_B$ or $W5_R$ | 351.9 nm | — | 0 |
| $W6_B$ or $W6_R$ | 374.3 nm | — | 0 |
| $W7_B$ or $W7_R$ | 411.5 nm | — | 161.4 nm |
| $H_B$ or $H_R$ | 775.5 nm | — | 800.0 nm |
| $\theta_B$ or $\theta_R$ | 5.87° | — | 11.81° |

TABLE 5 slanted grating coupler structure

| refractive index (n) | 1.9 |
|---|---|
| $P_{GC}$ | 430 nm |
| bottom left point BL | −65.2 nm |
| bottom right point BR | 115 nm |
| upper left point UL | −215.0 nm |
| upper right point UR | −80.7 nm |
| $H_{GC}$ | 355.5 nm |

TABLE 6

| TE | efficiency | | |
|---|---|---|---|
|  | blue light | green light | red light |
| deflector | 56.40% | 100% | 48.69% |
| slanted grating coupler structure | 83.51% | 86.42% | 92.18% |
| total | 47.10% | 86.42% | 44.88% |

In the experimental example 2, it can be seen from Table 6 that the total efficiency of the blue light BL was 47.10%, the total efficiency of the green light GL was 86.42%, and the total efficiency of the red light RL was 44.88%. It is considered that this example had good efficiencies of RGB lights.

Please refer to Tables 7-9 below and FIG. 3, FIG. 8, and FIG. 15. It shows experimental example 3 under the conditions that the shapes of the first meta-grating structure 1212am and the second meta-grating structure 1212bm of the grating structure 1212 are cylindrical, and the filter 125 is under the TE mode.

TABLE 7 meta-grating structures of the deflector

| TE | blue light = 460 nm | green light = 530 nm | red light = 620 nm |
|---|---|---|---|
| $\frac{P_B}{t}$ or $\frac{P_R}{m}$ | 471.0 nm | — | 494.0 nm |
| $W1_B$ or $W1_R$ | 120.5 nm | — | 0 nm |
| $W2_B$ or $W2_R$ | 146.6 nm | — | 0 nm |
| $W3_B$ or $W3_R$ | 171.9 nm | — | 181.0 nm |
| $W4_B$ or $W4_R$ | 187.6 nm | — | 236.1 nm |
| $W5_B$ or $W5_R$ | 212.5 nm | — | 281.3 nm |
| $W6_B$ or $W6_R$ | 0 | — | 342.5 nm |
| $W7_B$ or $W7_R$ | 0 | — | 418.4 nm |
| $H_B$ or $H_R$ | 848.2 nm | — | 790.1 nm |
| $\theta_B$ or $\theta_R$ | 9.37° | — | 12.08° |

TABLE 8 slanted grating coupler structure

| refractive index (n) | 1.9 |
|---|---|
| $P_{GC}$ | 430 nm |
| bottom left point BL | −8.8 nm |
| bottom right point BR | 215 nm |
| upper left point UL | −193.5 nm |
| upper right point UR | −55.7 nm |
| $H_{GC}$ | 236.5 nm |

TABLE 9

| TE | efficiency | | |
|---|---|---|---|
|  | blue light | green light | red light |
| deflector | 83.54% | 100% | 83.96% |
| slanted grating coupler structure | 80.73% | 88.80% | 80.33% |
| total | 67.44% | 88.80% | 67.44% |

In the experimental example 3, it can be seen from Table 9 that the total efficiency of the blue light BL was 67.44%, the total efficiency of the green light GL was 88.80%, and the total efficiency of the red light RL was 67.44%. It is considered that this example had good efficiencies of RGB lights.

Figure 16:
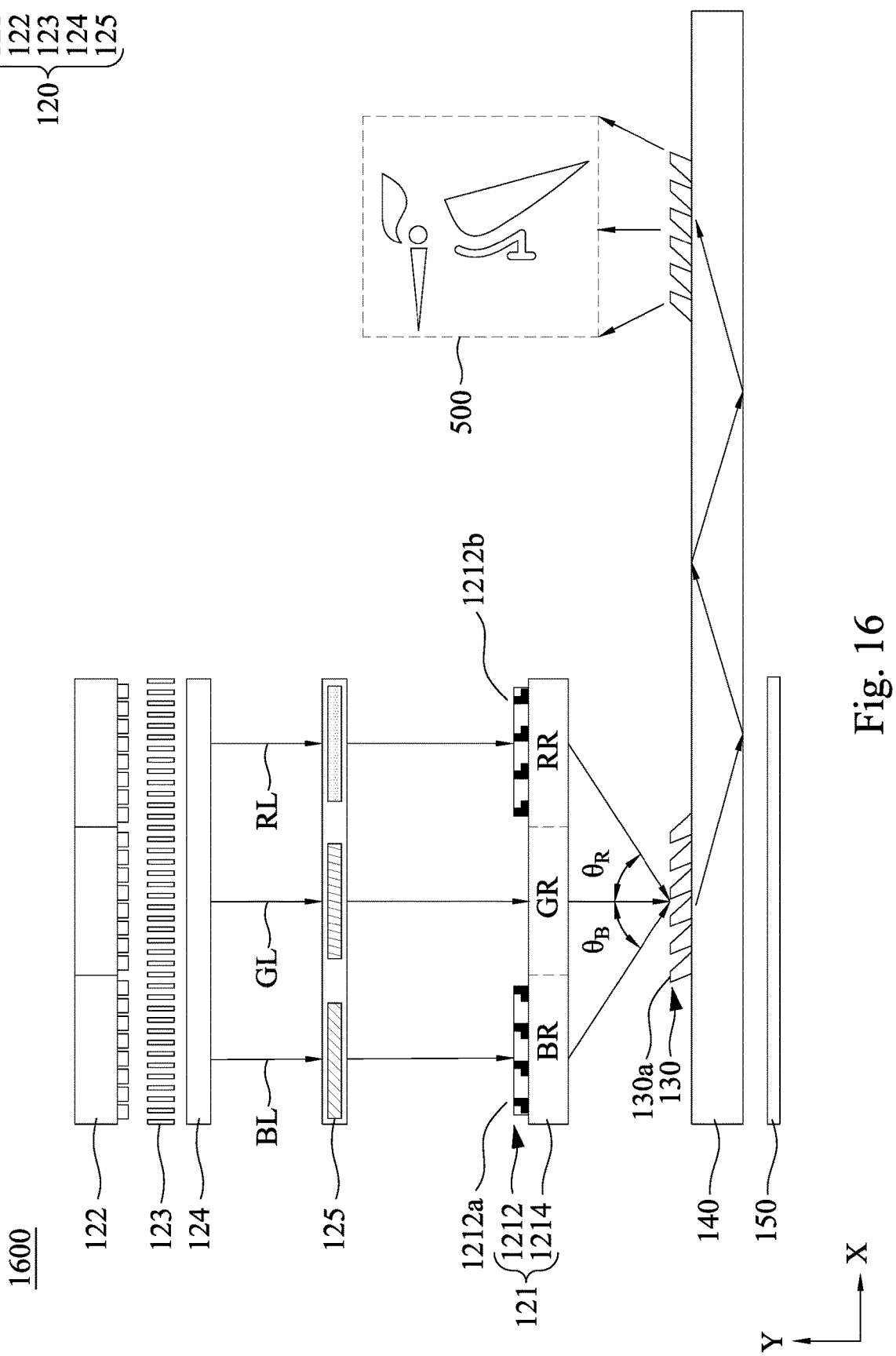
FIG. 16 is a schematic view of an optical system in accordance with some embodiments of the present disclosure.
Figure 17A:
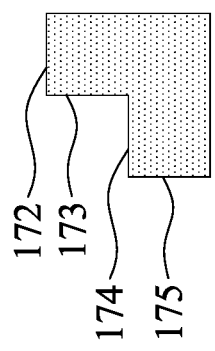
FIG. 17A is an enlargement view of the first grating deflector structure in FIG. 16.
Figure 17B:
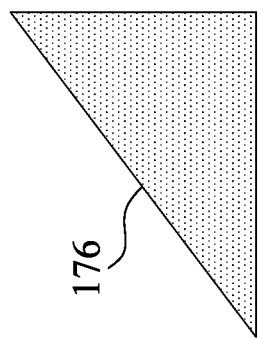
FIG. 17B and FIG. 17C are enlargement views of variation structures for the first grating deflector structure in FIG. 16.
Figure 17C:
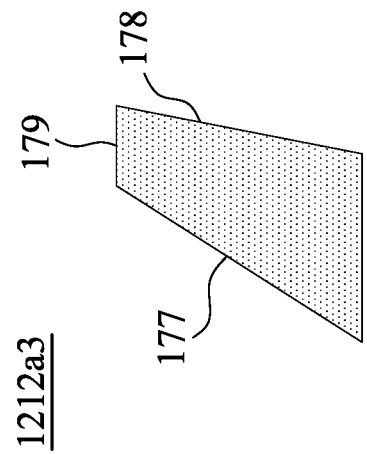

FIG. 16 is a schematic view of an optical system 1600 in accordance with some embodiments of the present disclosure. FIG. 17A is an enlargement view of the first grating deflector structure 1212a in FIG. 16. FIG. 17B and FIG. 17C are enlargement views of variation structures for the first grating deflector structure 1212a in FIG. 16. The first grating deflector structure 1212a of the grating structure 1212 in FIG. 16 may be the 3-step grating structure 1212a1 shown in FIG. 17A, a blazed grating structure 1212a2 shown in FIG. 17B, a slanted grating structure 1212a3 shown in FIG. 17C, or combinations thereof.

The difference between the optical system 1600 in FIG. 16 and the optical system 300 in FIG. 3 is the grating structure 1212. Specifically, the first grating deflector structure 1212a and the second grating deflector structures 1212b of the grating structure 1212 in FIG. 3 are meta-grating structures. In some embodiments, the first grating deflector structure 1212a and the second grating deflector structures 1212b of the grating structure 1212 in FIG. 16 are 3-step grating structures 1212a1 (please refer to FIG. 17A). It is understood that the number of the 3-step grating structures in FIG. 16 is merely for illustration, and it does not intend to limit the present disclosure.

Please refer to FIG. 17A, the 3-step grating structure 1212a1 includes multiple vertical sidewalls 173, 175 and multiple horizontal surfaces 172, 174. The horizontal surface 174 adjoins the vertical sidewalls 173, 175. The grating structure 1212a1 shown in FIG. 17A is a 3-step grating structure, however, it may be a n-step grating structure, and n≥3. Please refer to FIG. 17B, the blazed grating structure 1212a2 includes an oblique sidewall 176. The oblique sidewall 176 extends from a top of the blazed grating structure 1212a2 to a bottom of the blazed grating structure 1212a2, and a width of the blazed grating structure 1212a2 gradually increases from the top of the blazed grating structure 1212a2 to the bottom of the blazed grating structure 1212a2. Please refer to FIG. 17C, the slanted grating structure 1212a3 includes oblique sidewalls 177, 178 and a top surface 179. The top surface 179 adjoins the oblique sidewalls 177, 178. Each of the oblique sidewalls 177, 178 of the slanted grating structure 1212a3 has a first slope and a second slope. In some embodiments, the first slope is the same as the second slope. In some embodiments, the first slope is less than the second slope. In addition, variation structures of the second grating deflector structure 1212b could be mirror structures in a lateral symmetry of the first grating deflector structure 1212a shown in FIG. 17A to FIG. 17C.

FIG. 18 is a partial top view of the pair of smart glasses 100 in FIG. 1. The differences between the smart glasses 100 in FIG. 2 and the smart glasses 100A in FIG. 18 are the optical devices 120, 120a. The detailed drawing of the optical device 120a will be discussed in FIG. 19 below. Same features are labeled by the same numerical references, and descriptions of the same features are not repeated in the following figures.

Figure 19:
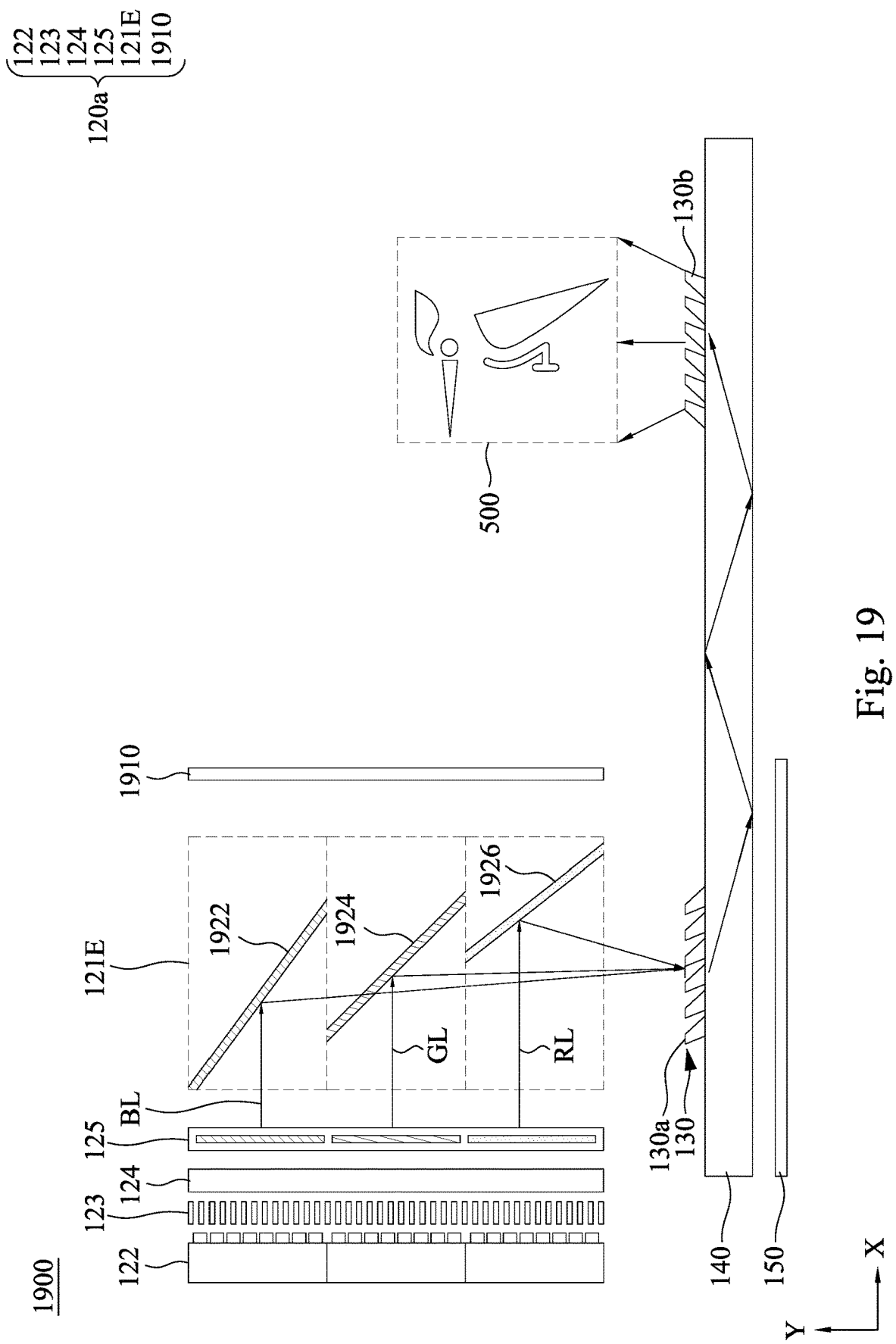
FIG. 19 is a schematic view of an optical system in accordance with some embodiments of the present disclosure.

FIG. 19 is a schematic view of an optical system 1900 in accordance with some embodiments of the present disclosure. The optical system 1900 includes the projector 122, the polarizer 123, the collimator 124, the filter 125, a deflector 121E, a light absorber 1910, the grating coupler structure 130, the light-guide lens 140, and the light absorber 150. The deflector 121E includes a blue dichroic filter 1922 for the blue light BL, a green dichroic filter 1924 for the green light GL, and a red dichroic filter 1926 for the red light RL. The blue dichroic filter 1922, the green dichroic filter 1924, and the red dichroic filter 1926 could be understood as filter coatings for reflecting lights.

Figure 20:
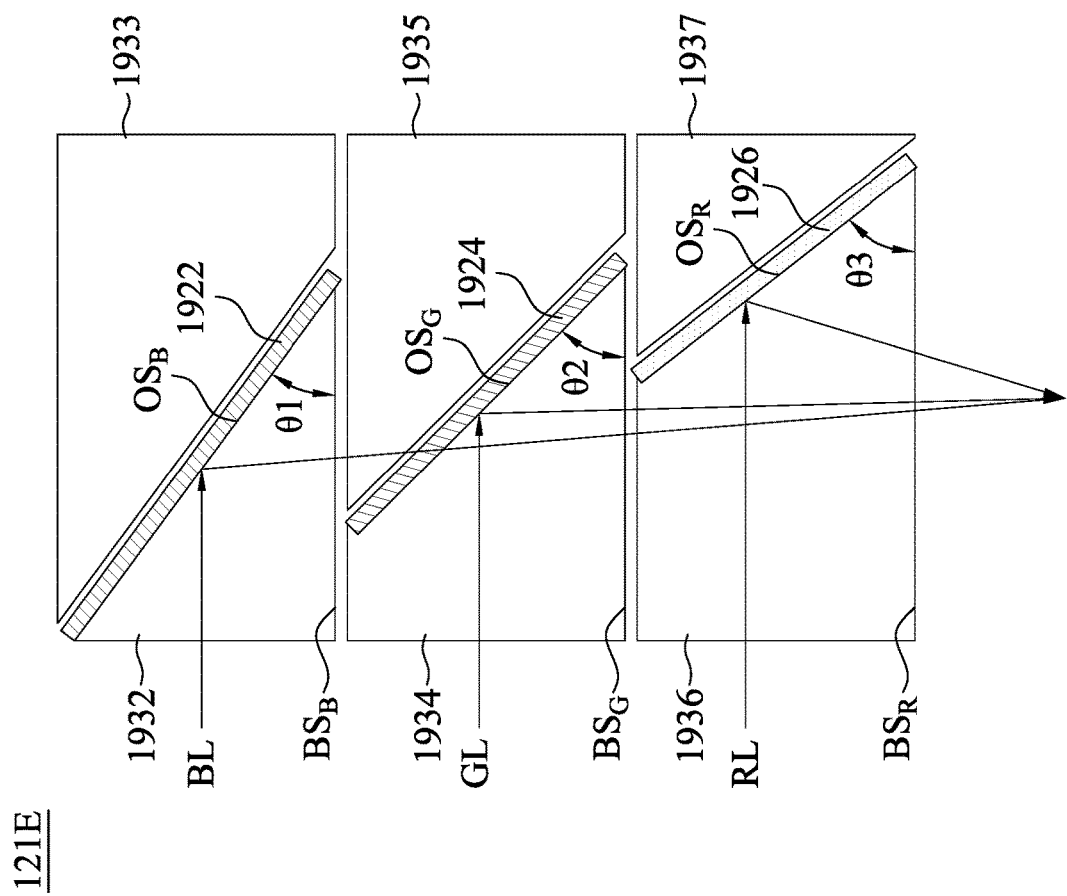
FIG. 20 is a partial view of the deflector in FIG. 19.

FIG. 20 is a partial view of the deflector 121E in FIG. 19. The deflector 121E includes a quartz 1932 having a first oblique surface $OS_B$ and a first bottom surface $BS_B$, a quartz 1934 having a second oblique surface $OS_G$ and a second bottom surface $BS_G$, a quartz 1936 having a third oblique surface $OS_R$ and a third bottom surface $BS_R$. The first bottom surface $BS_B$ of the quartz 1932, the second bottom surface $BS_G$ of the quartz 1934, and the third bottom surface $BS_R$ of the quartz 1936 are parallel to each other. The quartz 1932 has a first angle θ1 between the first oblique surface $OS_B$ and the first bottom surface $BS_B$ of the quartz 1932. The quartz 1934 has a second angle θ2 between the second oblique surface $OS_G$ and the second bottom surface $BS_G$ of the quartz 1934. The quartz 1936 has a third angle θ3 between the third oblique surface $OS_R$ and the third bottom surface $BS_R$ of the quartz 1936. In some embodiments, the second angle θ2 is 45 degrees, and θ1<θ2<θ3, as shown in FIG. 20.

Still refer to FIG. 20. The blue dichroic filter 1922 is disposed on the first oblique surface $OS_B$, the green dichroic filter 1924 is disposed on the second oblique surface $OS_G$, and the red dichroic filter 1926 is disposed on the third oblique surface $OS_R$. It is understood that the blue dichroic filter 1922 is aligned between the quartz 1932 and a quartz 1933 and assembled as a blue deflector cube. The green dichroic filter 1924 is aligned between the quartz 1934 and a quartz 1935 and assembled as a green deflector cube. The red dichroic filter 1926 is aligned between the quartz 1936 and a quartz 1934 and assembled as a red deflector cube. In some embodiments, a thickness of each of the blue deflector cube, the green deflector cube, and the red deflector cube is in a range from 1 to 10 mm. In some embodiments, the transmittance of a light smaller than 400 nm wavelength for the blue deflector cube is greater than 90%, and the reflection of a light greater than 400 nm wavelength for the blue deflector cube is greater than 90%. In some embodiments, the transmittance of alight smaller than 500 nm wavelength for the green deflector cube is greater than 90%, and the reflection of a light greater than 500 nm wavelength for the green deflector cube is greater than 90%. In some embodiments, the transmittance of a light smaller than 585 nm wavelength for the red deflector cube is greater than 90%, and the reflection of a light greater than 585 nm wavelength for the red deflector cube is greater than 90%. The blue deflector cube, the green deflector cube, and the red deflector cube are configured to adjust the incident angles of the three beams (three separated RGB images, refer to FIG. 5A to FIG. 5C) and expose on the same region of the of the first grating coupler structure 130a (refer to FIG. 19) as an merged color image (refer to FIG. 5D).

Please refer to FIG. 19 again. The light absorber 1910 is disposed aside (the right side of FIG. 19) the deflector 121E. The light absorber 1910 is configured to absorb beams which are not reflected by the blue dichroic filter 1922, the green dichroic filter 1924, and the red dichroic filter 1926 of the optical device 120a (see FIG. 18). The grating coupler structure 130, the light-guide lens 140, and the light absorber 150 are disposed below (the bottom side of FIG. 19) the deflector 121E. The three beams (the blue light BL, the green light GL, and the red light RL) emitting from the projector 122 would be reflect by the blue dichroic filter 1922, green dichroic filter 1924, and the red dichroic filter 1926 and then the three beams change incident angles and focus at the same region of the first grating coupler structure 130a of the grating coupler structure 130.

The optical systems of the present disclosure adjusts incident angles of three separated RGB images emitted from different positions, and then couple the RGB images with one deflector, one grating coupler, and one light-guide lens. In addition, the present disclosure provides optical systems including variation structures of the deflector. The deflector could include a meta-grating structure having multiple longitudinal units, a meta-grating structure having multiple cylinder units, a n-step grating structure, a blazed grating structure, a slanted grating structure. The deflector also could include three quartz cubes with a blue dichroic filter, a green dichroic filter, and a red dichroic filter. The optical system of the present disclosure could reduce the thickness of an optical device and provide high efficiencies of RGB lights (images).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical system, comprising:
    a projector emitting three beams having different wavelengths;
    a deflector disposed below the projector and configured to change incident angles of the three beams and to focus the three beams at the same region of a first grating coupler structure,
        wherein the first grating coupler structure is below the deflector and is configured to couple the three beams into a light-guide lens such that the three beams travel the same optical path within the light-guide lens,
        wherein the light-guide lens is connected to the first grating coupler structure and is configured to transmit the three beams;
    a polarizer disposed between the projector and the deflector and configured to filter out transverse electric (TE) modes or transverse magnetic (TM) modes of the three beams; and
    a second grating coupler structure disposed on the light-guide lens and configured to enable the three beams departing from the light-guide lens after the three beams have traveled the same optical path.

2. The optical system of claim 1, wherein the deflector comprises:
    a substrate having a blue region, a green region, and a red region, wherein the blue region and the red region are separated by the green region;
    a first grating deflector structure disposed on the blue region of the substrate; and
    a second grating deflector structure disposed on the red region of the substrate.

3. The optical system of claim 2, wherein a spacing between the blue region and the green region is in a range from 100 nm to 2 mm.

4. The optical system of claim 2, wherein each of the first grating deflector structure and the second grating deflector structure comprises a blazed grating structure, a n-step grating structure, a slanted grating structure, or combinations thereof, wherein a refractive index of each of the first grating deflector structure and the second grating deflector structure is in a range from 1.7 to 3.5.

5. The optical system of claim 2, wherein the first grating deflector structure comprises a first meta-grating structure, the first meta-grating structure comprises a first longitudinal unit having a first width W1, a second longitudinal unit having a second width W2, a third longitudinal unit having a third width W3, and W1≤W2≤W3,
wherein the first longitudinal unit, the second longitudinal unit, and the third longitudinal unit sequentially are disposed along an outer surface of the blue region of the substrate to an inner surface of the blue region of the substrate.

6. The optical system of claim 5, wherein the first meta-grating structure further comprises a fourth longitudinal unit having a fourth width W4, a fifth longitudinal unit having a fifth width W5, and W3≥W4≥W5,
wherein the fourth longitudinal unit is next to the third longitudinal unit, and the fifth longitudinal unit is next to the fourth longitudinal unit.

7. The optical system of claim 5, wherein the second grating deflector structure comprises a second meta-grating structure, the second meta-grating structure comprises a fourth longitudinal unit having a fourth width W4, a fifth longitudinal unit having a fifth width W5, a sixth longitudinal unit having a sixth width W6, and W4≤W5≤W6,
wherein the fourth longitudinal unit, the fifth longitudinal unit, and the sixth longitudinal unit sequentially are disposed along an outer surface of the red region of the substrate to an inner surface of the red region of the substrate.

8. The optical system of claim 7, wherein the second meta-grating structure further comprises a seventh longitudinal unit having a seventh width W7, an eighth longitudinal unit having a eighth width W8, and W6≥W7≥W8,
wherein the seventh longitudinal unit is next to the fourth longitudinal unit, and the eighth longitudinal unit is next to the seventh longitudinal unit.

9. The optical system of claim 7, wherein the first longitudinal unit, the second longitudinal unit, and the third longitudinal unit have a first height,
the fourth longitudinal unit, the fifth longitudinal unit, and the sixth longitudinal unit have a second height, and
the first height is the same as the second height.

10. The optical system of claim 7, wherein the first longitudinal unit, the second longitudinal unit, and the third longitudinal unit have a first height,
the fourth longitudinal unit, the fifth longitudinal unit, and the sixth longitudinal unit have a second height, and
the first height is different from the second height.

11. The optical system of claim 7, wherein a first period of the first grating deflector structure is the same as a second period of the second grating deflector structure.

12. The optical system of claim 7, wherein a first period of the first grating deflector structure is different from a second period of the second grating deflector structure.

13. The optical system of claim 2, wherein the first grating deflector structure comprises a first meta-grating structure, the first meta-grating structure comprises a plurality of longitudinal units gradational in width,
the second grating deflector structure comprises a second meta-grating structure, the second meta-grating structure comprises a plurality of longitudinal units gradational in width, and
the number of the longitudinal units of the first meta-grating structure is the same as the number of the longitudinal units of the second meta-grating structure.

14. The optical system of claim 2, wherein the first grating deflector structure comprises a first meta-grating structure, the first meta-grating structure comprises a plurality of longitudinal units gradational in width,
the second grating deflector structure comprises a second meta-grating structure, the second meta-grating structure comprises a plurality of longitudinal units gradational in width, and
the number of the longitudinal units of the first meta-grating structure is different from the number of the longitudinal units of the second meta-grating structure.

15. The optical system of claim 2, wherein each of the first grating deflector structure and the second grating deflector structure comprises a first cylinder unit having a first diameter D1, a second cylinder unit having a second diameter D2, a third cylinder unit having a third diameter D3, and D1≤D2≤D3,
wherein the first cylinder unit, the second cylinder unit, and the third cylinder unit sequentially are disposed along an outer surface of the blue region or the red region of the substrate to an inner surface of the blue region or the red region of the substrate.

16. The optical system of claim 15, wherein each of the first grating deflector structure and the second grating deflector structure further comprises a fourth cylinder unit having a fourth diameter D4, a fifth cylinder unit having a fifth diameter D5, and D3≥D4≥D5,
wherein the fourth cylinder unit is next to the third cylinder unit, and the fifth cylinder unit is next to the fourth cylinder unit.

17. The optical system of claim 15, wherein the first cylinder unit, the second cylinder unit, and the third cylinder unit have the same height.

18. The optical system of claim 1, wherein the deflector comprises a first quartz having a first oblique surface and a first bottom surface, a second quartz having a second oblique surface and a second bottom surface, a third quartz having a third oblique surface and a third bottom surface, and the first bottom surface, the second bottom surface, and the third bottom surface are parallel to each other,
wherein the first quartz has a first angle θ1 between the first oblique surface and the first bottom surface, the second quartz has a second angle θ2 between the second oblique surface and the second bottom surface, the third quartz has a third angle θ3 between the third oblique surface and the third bottom surface, and θ1<θ2<θ3,
wherein a first dichroic filter is disposed on the first oblique surface, a second dichroic filter is disposed on the second oblique surface, and a third dichroic filter is disposed on the third oblique surface.

19. The optical system of claim 18, wherein the second angle θ2 is 45 degrees.

20. The optical system of claim 18, further comprising a light absorber disposed aside the deflector.

* * * * *